United States Patent
Yang et al.

(10) Patent No.: US 12,493,726 B1
(45) Date of Patent: Dec. 9, 2025

(54) TEST METHOD FOR ALGORITHM APPLIED TO HANDLING EQUIPMENT, COMPUTER PROGRAM PRODUCT, AND COMPUTER-READABLE STORAGE MEDIUM

(71) Applicant: VisionNav Robotics USA Inc., Acworth, GA (US)

(72) Inventors: Lei Yang, Acworth, GA (US); Lisha Huang, Acworth, GA (US); Yongxian Zeng, Acworth, GA (US); Shifei Yan, Acworth, GA (US)

(73) Assignee: VisionNav Robotics USA Inc., Acworth, GA (US)

( * ) Notice: Subject to any disclaimer, the term of this patent is extended or adjusted under 35 U.S.C. 154(b) by 0 days.

(21) Appl. No.: 19/067,753

(22) Filed: Feb. 28, 2025

(30) Foreign Application Priority Data

Jan. 17, 2025 (CN) .......................... 202510075339.6

(51) Int. Cl.
*G06F 30/15* (2020.01)
*G06F 30/20* (2020.01)

(52) U.S. Cl.
CPC .............. *G06F 30/15* (2020.01); *G06F 30/20* (2020.01)

(58) Field of Classification Search
CPC ................................ G06F 30/15; G06F 30/20
USPC ........................................................... 703/2
See application file for complete search history.

(56) References Cited

U.S. PATENT DOCUMENTS

2013/0172079 A1* 7/2013 Ivanov .................... A63F 13/35
463/31

FOREIGN PATENT DOCUMENTS

CN 111949544 A 11/2020
CN 119129241 A 12/2024

OTHER PUBLICATIONS

MATLAB_2024 (Automate Testing for Vision Vehicle Detector, MATLAB Help Center 2024) (Year: 2024).*
Emulate3D_2024 (Downloaded from https://store.sim3d.com indexed into Google on Mar. 13, 2024) (Year: 2024).*
Masood_2021 (From Drive-By-Wire to autonomous Vehicle: Urban Freight Vehicle Perspectives, Sustainability Jan. 22, 2021) (Year: 2021).*
GrabCAD_2019 (downloaded from https://grabcab.com/library models uploaded 2011, 2012, 2019) (Year: 2019).*

(Continued)

*Primary Examiner* — Brian S Cook
(74) *Attorney, Agent, or Firm* — Getech Law LLC; Jun Ye

(57) ABSTRACT

The present disclosure discloses a method for testing an algorithm applied to handling equipment. The method includes generating test cases and corresponding simulation carrier point clouds according to handling device system parameters and simulation carrier model files. Simulation carrier models in the simulation carrier model files are not exactly the same and carrier parameters vary. The method further includes obtaining simulation carrier point clouds corresponding to the simulation carrier models with different shapes and sizes, so that the simulation carrier models may be used to test the to-be-tested perception algorithm. Thereafter, a simulation test result is obtained by performing a simulation test on the to-be-tested perception algorithm with a simulation carrier point cloud corresponding to a target test case.

19 Claims, 5 Drawing Sheets

(56) References Cited

OTHER PUBLICATIONS

Song_2023 (Pallet Localization Techniques for Forklift Robot: A Review of Recent Progress, Journal of Robotics and Mechanical Engineering, 2021). (Year: 2021).*
Basl_2024 (Pallet Truck Trajectory Design and Control, May 2024) (Year: 2024).*
MATLAB_Sensor_Fusion_2024 (Automate Testing for Forward Vehicle Sensor Fusion, downloaded from Matlab.com Wayback Machine dated Jun. 16, 2024). (Year: 2024).*
Masis_2022 (The Effect of Forklift Type, Pallet Design, Entry Speed, and Top Load on the Horizontal Shock Impacts Exerted during the Interactions between Pallet and Forklift, Jul. 12, 2022). (Year: 2022).*

* cited by examiner

TEST METHOD FOR ALGORITHM APPLIED TO HANDLING EQUIPMENT, COMPUTER PROGRAM PRODUCT, AND COMPUTER-READABLE STORAGE MEDIUM

TECHNICAL FIELD

The present disclosure relates to the field of computer technologies, and in particular, to a test method, a computer program product, and a computer-readable storage medium.

BACKGROUND

In modern industrial production and logistics management, handling devices (such as forklifts) are widely used in warehouses, factories, distribution centers, and other scenarios. To improve operation efficiency and safety, a handling device may be equipped with a perception system to collect environmental information of an environment where the handling device is located, and to assist the handling device in automatic identification and positioning. The perception system may be implemented by the cooperation of sensors and perception algorithms. For example, in the positioning and handling tasks of carriers such as pallets and wire mesh containers, a radar sensor equipped on the handling device may generate point cloud data containing carrier information. The perception algorithm may identify a carrier from the point cloud data generated by the radar sensor and determine a pose of the carrier relative to the handling device. Therefore, the identification precision of the perception algorithm is ensured, the precision of the perception system of the handling device in perceiving the environment where the handling device is located may be improved, and the efficiency and safety of the handling device for executing tasks are achieved. Based on this, how to ensure the identification precision of the perception algorithm is one of the problems that need to be solved urgently.

In the prior art, a test scenario may be constructed manually, in which a handling device equipped with a radar sensor is placed, and a carrier is deployed on the handling device. A pose of the carrier relative to the handling device is measured manually as an actual pose, and then the point cloud data of the carrier in the actual pose is acquired by the radar sensor as a test point cloud. Therefore, the test point cloud and the actual pose of the carrier are used to test whether a perception algorithm can correctly identify the pose of the carrier.

However, in actual applications, perception algorithms may be required to identify and locate different carriers, and different carriers have different shapes and sizes. The above test solution can only generate point cloud data based on carriers with limited shapes and sizes, which greatly limits the diversity of test point clouds used when testing perception algorithms. In addition, manually measuring the actual pose of the carrier is extremely labor-intensive and time-consuming and has limited precision, which reduces the test efficiency of the perception algorithm.

SUMMARY

The present disclosure provides a test method, a computer program product, and a computer-readable storage medium to partially solve the above problems existing in the prior art.

The present disclosure adopts the following technical solutions.

The present disclosure provides a test method, which includes:
  pre-acquiring handling device system parameters and simulation carrier model files; wherein each of the simulation carrier model files contains a simulation carrier model and carrier parameters, the simulation carrier models contained in different simulation carrier model files are not exactly the same, and the carrier parameters contained in different simulation carrier model files vary;
  determining test cases according to the handling device system parameters and the simulation carrier model files;
  generating simulation carrier point clouds corresponding to the test cases; and
  in response to a simulation test request, calling a target test case in the test cases, and performing simulation test on a to-be-tested perception algorithm according to a simulation carrier point cloud corresponding to the target test case to obtain a simulation test result of the to-be-tested perception algorithm.

Optionally, the handling device system parameters include at least one of handling device parameters, sensor parameters, simulation scenario parameters, and pose transformation strategies; wherein a simulation sensor described by the sensor parameters is configured on a simulation handling device model described by the handling device parameters, and each of the pose transformation strategies is configured to indicate to transform a pose of the simulation handling device model or a pose of the simulation carrier model.

Optionally, the determining test cases according to the handling device system parameters and the simulation carrier model files includes:
  selecting at least one simulation carrier model file from the simulation carrier model files;
  selecting at least one set of handling device system parameters from the handling device system parameters; wherein the set of selected handling device system parameters contains at least one set of handling device parameters and at least one set of sensor parameters;
  generating a test task according to the selected simulation carrier model file and the selected handling device system parameters; and
  performing permutation and combination on the simulation carrier model file and the handling device system parameters contained in the test task to obtain test cases corresponding to the test task.

Optionally, the determining test cases according to the handling device system parameters and the simulation carrier model files includes:
  in response to a selection operation of a user, determining at least one selected simulation carrier model file from the simulation carrier model files, and determining at least one set of selected handling device system parameters from the handling device system parameters; wherein the set of selected handling device system parameters contains at least one set of handling device parameters and at least one set of sensor parameters; and
  generating test cases according to the selected simulation carrier model files and the selected handling device system parameters.

Optionally, the set of selected handling device system parameters further contains at least one set of simulation scenario parameters and/or at least one set of pose transformation strategies.

Optionally, the handling device system parameter in the test case contains a handling device parameter and a sensor parameter;

the generating simulation carrier point clouds corresponding to the test cases includes:

for each of the test cases, determining an initial pose of a simulation carrier model according to the simulation carrier model and carrier parameters contained in the simulation carrier model file in the test case;

determining an initial pose of a simulation handling device model according to the handling device parameters in the test case;

determining a reference relative pose of the simulation carrier model relative to the simulation handling device model according to the initial pose of the simulation handling device model and the initial pose of the simulation carrier model; and generating a simulation carrier point cloud corresponding to the test case according to the sensor parameter in the test case and the reference relative pose.

Optionally, the handling device system parameter in the test case further contains a pose transformation strategy;

the determining a reference relative pose of the simulation carrier model relative to the simulation handling device model according to the initial pose of the simulation handling device model and the initial pose of the simulation carrier model includes:

when the pose transformation strategy in the test case is a first pose transformation strategy, transforming the initial pose of the simulation handling device model, and determining a reference relative pose of the simulation handling device model relative to the simulation handling device model according to a transformed pose of the simulation handling device model and the initial pose of the simulation carrier model; and when the pose transformation strategy in the test case is a second pose transformation strategy, transforming the initial pose of the simulation carrier model, and determining the reference relative pose of the simulation carrier model relative to the simulation handling device model according to the initial pose of the simulation handling device model and a transformed pose of the simulation carrier model.

Optionally, the handling device system parameter in the test case further contains a simulation scenario parameter;

the generating a simulation carrier point cloud corresponding to the test case according to the sensor parameter in the test case and the reference relative pose includes:

generating a simulation carrier point cloud corresponding to the test case according to the sensor parameter and the simulation scenario parameter in the test case as well as the reference relative pose.

Optionally, the performing simulation test on a to-be-tested perception algorithm according to a simulation carrier point cloud corresponding to the target test case to obtain a simulation test result of the to-be-tested perception algorithm includes:

inputting the simulation carrier point cloud corresponding to the target test case into a to-be-tested perception algorithm, and identifying and obtaining a target relative pose of a simulation carrier model relative to a simulation handling device model in the target test case from the simulation carrier point cloud corresponding to the target test case by the to-be-tested perception algorithm; and taking a reference relative pose of the simulation carrier model relative to the simulation handling device model in the target test case as a reference, and determining the simulation test result of the to-be-tested perception algorithm according to a difference between the target relative pose and the reference relative pose.

Optionally, one test case corresponds to a plurality of sets of simulation carrier point clouds, and reference relative poses of the simulation carrier models corresponding to different sets of the simulation carrier point clouds relative to the simulation handling device model vary.

Optionally, the performing simulation test on a to-be-tested perception algorithm according to a simulation carrier point cloud corresponding to the target test case to obtain a simulation test result of the to-be-tested perception algorithm includes:

for each set of simulation carrier point clouds corresponding to the target test case, inputting the set of simulation carrier point clouds into a to-be-tested perception algorithm, and identifying and obtaining a target relative pose of a simulation carrier model corresponding to the set of simulation carrier point clouds relative to a simulation handling device model from the set of simulation carrier point clouds by the to-be-tested perception algorithm;

taking a reference relative pose of the simulation carrier model corresponding to the set of simulation carrier point clouds relative to the simulation handling device model as a reference, and determining a simulation test result of the to-be-tested perception algorithm for detecting the set of simulation carrier point clouds according to a difference between the reference relative pose corresponding to the set of simulation carrier point clouds and the target relative pose corresponding to the set of simulation carrier point clouds; and detecting a simulation test result of each set of simulation carrier point clouds corresponding to the target test case according to the to-be-tested perception algorithm, and determining the simulation test result of the to-be-tested perception algorithm.

Optionally, different sets of simulation carrier point clouds correspond to different test distances, and the test distance is defined as a distance between a carrier fork entry surface of a simulation carrier model and a center of a vehicle body of a simulation handling device model.

Optionally, the to-be-tested perception algorithm includes a plurality of perception algorithms, and different perception algorithms detect different features of a carrier when identifying a carrier pose.

Optionally, the performing simulation test on a to-be-tested perception algorithm according to a simulation carrier point cloud corresponding to the target test case to obtain a simulation test result of the to-be-tested perception algorithm includes:

for each to-be-tested perception algorithm, inputting a simulation carrier point cloud corresponding to the target test case into the to-be-tested perception algorithm, and identifying and obtaining a relative pose of a simulation carrier model in the target test case relative to a simulation handling device model from the simulation carrier point cloud corresponding to the target test case through detecting a feature of a carrier by the to-be-tested perception algorithm, wherein the relative pose is used as a target relative pose output by the to-be-tested perception algorithm; and taking a reference relative pose of the simulation carrier model relative to the simulation handling device model in the target test case as a reference, and determining the simulation test result of the to-be-tested perception algorithm according to a difference between the target relative pose output by the to-be-tested perception algorithm and the reference relative pose.

Optionally, the method further includes:

pre-acquiring a real carrier point cloud corresponding to the target test case;

in response to a real test request, testing the to-be-tested perception algorithm according to the real carrier point cloud corresponding to the target test case to obtain a real test result of the to-be-tested perception algorithm; and determining a comprehensive test result of the to-be-tested perception algorithm according to the simulation test result and the real test result.

Optionally, the pre-acquiring simulation carrier model files includes:

pre-receiving simulation carrier models input by a user and sizes corresponding to the simulation carrier models;

determining carrier parameters according to the sizes corresponding to the simulation carrier models; and generating the simulation carrier model files according to the simulation carrier models and the carrier parameters.

Optionally, the method further includes:

statistically analyzing simulation test results of the to-be-tested perception algorithm, and determining a precision of the to-be-tested perception algorithm for detecting a pose of a simulation carrier model corresponding to the target test case; and generating a test report corresponding to the to-be-tested perception algorithm according to the determined precision of the to-be-tested perception algorithm for detecting the pose of the simulation carrier model corresponding to the target test case.

Optionally, the performing simulation test on a to-be-tested perception algorithm according to a simulation carrier point cloud corresponding to the target test case to obtain a simulation test result of the to-be-tested perception algorithm includes:

acquiring a preset query period and a preset test timeout duration;

when the query period is reached, querying whether there is a simulation test result of the to-be-tested perception algorithm obtained by executing the target test case; if yes, updating a test state of the target test case to be completed, and displaying the completed test state of the target test case to a user; if no, continuing to wait; and when the preset test timeout duration is reached, and a query finds that there is no simulation test result of the to-be-tested perception algorithm obtained by executing the target test case, updating a test state of the target test case to be abnormal, and displaying the abnormal test state of the target test case to a user.

The present disclosure provides a computer program product, including a computer program which, when executed by a processor, implements the test method.

The present disclosure provides a computer-readable storage medium, storing a computer program which, when executed by a processor, implements the test method.

At least one of the above technical solutions adopted in the present disclosure can achieve the following beneficial effects:

In the test method provided by the present disclosure, the test cases and the corresponding simulation carrier point clouds are generated according to the handling device system parameters and the simulation carrier model files, and since the simulation carrier models in the simulation carrier model files are not exactly the same and the carrier parameters vary, the simulation carrier point clouds corresponding to the simulation carrier models with different shapes and sizes may be obtained, so that the simulation carrier models with various shapes and sizes are used to test the to-be-tested perception algorithm, and the identification precision of the to-be-tested perception algorithm on carriers with different shapes and sizes is effectively verified. In addition, the simulation test result is obtained by performing simulation test on the to-be-tested perception algorithm with the simulation carrier point cloud corresponding to the target test case, so that manual operation is not required in the entire test process, which greatly reduces labor and time consumption, improves the test efficiency, and reduces the test cost.

BRIEF DESCRIPTION OF THE DRAWINGS

The drawings described herein are used to provide a further understanding of the present disclosure and constitute a part of the present disclosure. The illustrative embodiments of the present disclosure and the descriptions thereof are used to explain the present disclosure and do not constitute improper limitations on the present disclosure. In the drawings:

FIG. 6 is a schematic diagram of a task generation interface according to the present disclosure;

FIG. 7 is a schematic diagram of a test case customization interface according to the present disclosure;

FIG. 8 is a schematic diagram of a simulation carrier model file management interface according to the present disclosure;

FIG. 9 is a schematic diagram of a handling device parameter management interface according to the present disclosure;

FIG. 10 is a schematic diagram of a sensor parameter management interface according to the present disclosure; and FIG. 11 is a schematic diagram of a simulation scenario parameter management interface according to the present disclosure.

DETAILED DESCRIPTION

Figure 1:
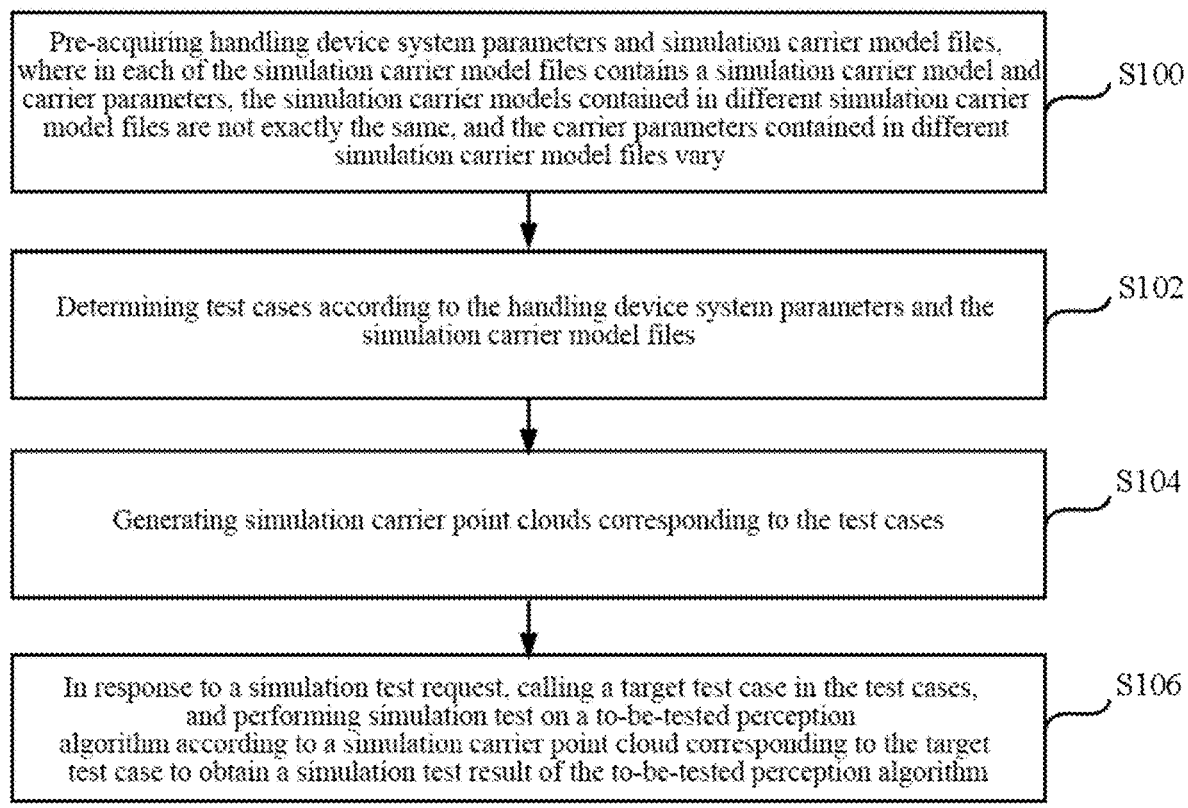
FIG. 1 is a schematic flowchart of a test method according to the present disclosure.

To make the objects, technical solutions and advantages of the present disclosure clearer and more complete, the technical solutions of the present disclosure will be described in detail and completely with reference to the specific embodiments of the present disclosure and the accompanying drawings. It is clear that the described embodiments are merely some rather than all of embodiments of the present disclosure. Based on the embodiments of the present disclosure, all other embodiments obtained by those of ordinary skill in the art without creative effort fall within the protection scope of the present disclosure.

In addition, it should be noted that acquiring signals, information or data in the present disclosure are performed in compliance with the corresponding data protection laws and policies of the location and with the authorization given by the owner of the corresponding device.

The embodiments below and the features in the implementations may be mutually combined in the case of no conflict.

The technical solutions provided by the embodiments of the present disclosure are described in detail below with reference to the accompanying drawings.

As mentioned above, in existing perception algorithm testing solutions, the test scenarios are generally constructed manually based on the actual scenarios in which the perception algorithms are applied, and the test scenario may be indoors or outdoors. A handling device equipped with sensors and perception algorithms is placed in the test scenario. After a carrier is placed in a test scenario, a pose of the carrier relative to a handling device may be manually measured to serve as an actual pose. A sensor equipped on the handling device may acquire point cloud data of the carrier to serve as a test point cloud, the test point cloud is analyzed by a perception algorithm, and the perception algorithm may identify and position the carrier to obtain an estimated pose of the carrier relative to the handling device. The estimated pose is compared with the actual pose to determine the accuracy of perception algorithm positioning. However, the above solution has several defects:

Firstly, the handling device and the carrier are physical, and the shapes and the sizes of the physical handling device and the physical carriers are limited and cannot be flexibly changed in a test scenario. In particular, carriers have various types, shapes and sizes, and test point clouds acquired in a test scenario are difficult to cover the combination of different types, shapes and sizes; consequently, a perception algorithm may only test based on the test point clouds generated by the limited carriers. In actual applications, the perception algorithm is faced with a variety of different types, shapes and sizes of carriers, which may result in qualified performance in testing but poor performance in actual applications; consequently, the perception algorithm has to be tested again based on more types, shapes and sizes of carriers, which greatly reduces the efficiency of the test.

Secondly, to expand the test data, the sensors are usually required to acquire point cloud data at different poses as test point clouds. Under this premise, it is necessary to manually move a carrier and measure a carrier pose a plurality of times, and a sensor scans a plurality of times to obtain test point clouds in a plurality of actual poses; and alternatively, it is necessary to manually place a carrier, measure a carrier pose, acquire point cloud data of the carrier in an actual pose, and then import into a test platform. In the test platform, the pose corresponding to the point cloud data is changed multiple times to obtain the test point cloud in a plurality of actual poses. Obviously, manually moving the carrier or manually measuring the carrier pose is extremely labor-intensive and time-consuming. In addition, the precision of manual measurement of the carrier pose is limited, which also reduces the test efficiency of the perception algorithm.

Thirdly, the perception algorithm actually performs identification and positioning according to the test point cloud within a certain range of a certain target point, if a target point identified by the perception algorithm is far away from the test point cloud under a central coordinate system of a vehicle body, the point cloud data for estimating the pose is sparse, and the perception algorithm may not normally identify the carrier pose, even completely miss the existence of the carrier. During the test, the actual poses of the carrier corresponding to different sets of test point clouds are different. When the test point cloud is changed, a target point used to test the perception algorithm based on the previous set of test point clouds may not be applicable to current set of test point clouds, and the above problem of the target point being far away from the test point cloud may occur. Therefore, each time the test point cloud is changed, a tester needs to manually modify the target points on the test platform to ensure that the perception algorithm can normally identify the current set of test point clouds. This process is extremely dependent on the experience of the tester and is also extremely time consuming, resulting in a reduction in test efficiency.

In view of the above, the present disclosure provides a test method, which includes generating a simulation carrier point cloud by pre-acquiring handling device system parameters and simulation carrier model files, and performing simulation test on the to-be-tested perception algorithm by the simulation carrier point cloud. Since the simulation carrier models contained in different simulation carrier model files are not exactly the same, the simulation point cloud generated based on the simulation carrier models of different types, shapes and sizes may be tested, so that the simulation test can cover more actual situations. In addition, during the entire test, there is no need to manually move the carrier, manually measure the carrier pose, or manually modify the target point, which saves manpower and time costs while improving the precision of the actual pose, thereby improving test efficiency.

FIG. 1 is a schematic flowchart of a test method according to the present disclosure, which includes the following steps:

S100: Pre-acquiring handling device system parameters and simulation carrier model files. Each of the simulation carrier model files contains a simulation carrier model and carrier parameters, the simulation carrier models contained in different simulation carrier model files are not exactly the same, and the carrier parameters contained in different simulation carrier model files vary.

A test method provided in an embodiment of the present disclosure may be executed by an electronic device for testing. The electronic device may be an independent physical server, a server cluster or distributed system composed of a plurality of physical servers, or a cloud server providing cloud computing services. This is not limited in the present disclosure. For convenience of explanation, in one or more subsequent embodiments of the present disclosure, a specific embodiment is described in detail by taking the test platform shown in FIG. 2 executing the test method provided in the present disclosure as an example. The test platform 200 at least includes a front-end interaction system 210 and a back-end management system 220. The front-end interaction system 210 is configured to display interfaces to a user by a terminal device 230, receive information (such as handling device parameters, sensor parameters, simulation carrier models, carrier parameters, and simulation scenario parameters) and operations (such as generating test tasks and test cases, performing simulation tests, and outputting test reports) input by the user in the interfaces through the terminal device 230, and forward acquired information and operations to a server 240 of the back-end management system 220. The server 240 of the back-end management system 220 is configured to receive information input by the user through the front-end interaction system 210, and store the received information to a database 250 through a specific interface, as well as perform test task generation, test case generation, testing of the to-be-tested perception algorithm and test report generation in response to the operation of the user. The front-end interaction system 210 and the back-end management system 220 can communicate via any existing type of communication media, such as a wired communication link or a wireless communication link. The wireless communication link includes but is not limited to: Bluetooth, Wi-Fi, near-field communication, and cellular mobile communication networks to achieve the reception or transmission of information and operations. In addition, the front-end interaction system 210 shown in FIG. 2 only contains one terminal device 230. However, based on an actual application scenario, a plurality of terminal devices 230 may be deployed in the front-end interaction system 210, and communication connections between the terminal devices and the server 240 of the back-end management system 220 are established, so as to provide a test function for a plurality of users.

Specifically, the test platform may pre-acquire handling device system parameters and simulation carrier model files, and store the system parameters and the model files in a database. Each of the simulation carrier model files contains a simulation carrier model and carrier parameters, the simulation carrier models contained in different simulation carrier model files are not exactly the same, and the carrier parameters contained in different simulation carrier model files vary. The handling device system parameters are used to describe other simulation models associated with a test task in the simulation scenario and the simulation scenario, and may include one or more of handling device parameters used to describe simulation handling device models, sensor parameters used to describe simulation sensors, pose transformation strategies used to determine a reference relative pose of the simulation carrier model relative to the simulation handling device model, and simulation scenario parameters used to describe the simulation scenario. In the present disclosure, the handling device system parameters pre-acquired by the test platform may be determined based on a specific test requirement. The type and the number of the parameters contained in the pre-acquired handling device system parameters are not specifically limited in the present disclosure.

The simulation carrier model file includes a simulation carrier model and corresponding carrier parameters thereof. The simulation carrier model may be a three-dimensional model. Various carrier parameters may include the carrier type, the size of carrier fork entry surface, the offsets of a fork entry point relative to the origin in all directions, the carrier material and color, the pier width, the pier height, the hole width, the panel height, the floor height, the panel protrusion, the column width, the spacing between columns, the offset of a fork entry height relative to a beam height, overall vertical offset distance of the region of interest, and other data used to describe the simulation carrier model.

For the simulation carrier model files, the simulation carrier models contained in different simulation carrier model files may be the same or different. Generally, different simulation carrier model files contain different carrier parameters. Therefore, even if the simulation carrier models contained in the two simulation carrier model files are the same, the two simulation carrier model files may describe the simulation carrier models with different sizes due to different carrier parameters. Since the simulation carrier models in the simulation carrier model files are not exactly the same and the carrier parameters are different, the simulation carrier point clouds corresponding to the simulation carrier models of different types, shapes and sizes may be obtained, so that the simulation test may be performed, the simulation test may cover more situations, and the simulation test is not limited by the types, the shapes and the sizes of the physical carriers or whether the physical carriers are in a real test field.

Figure 2:
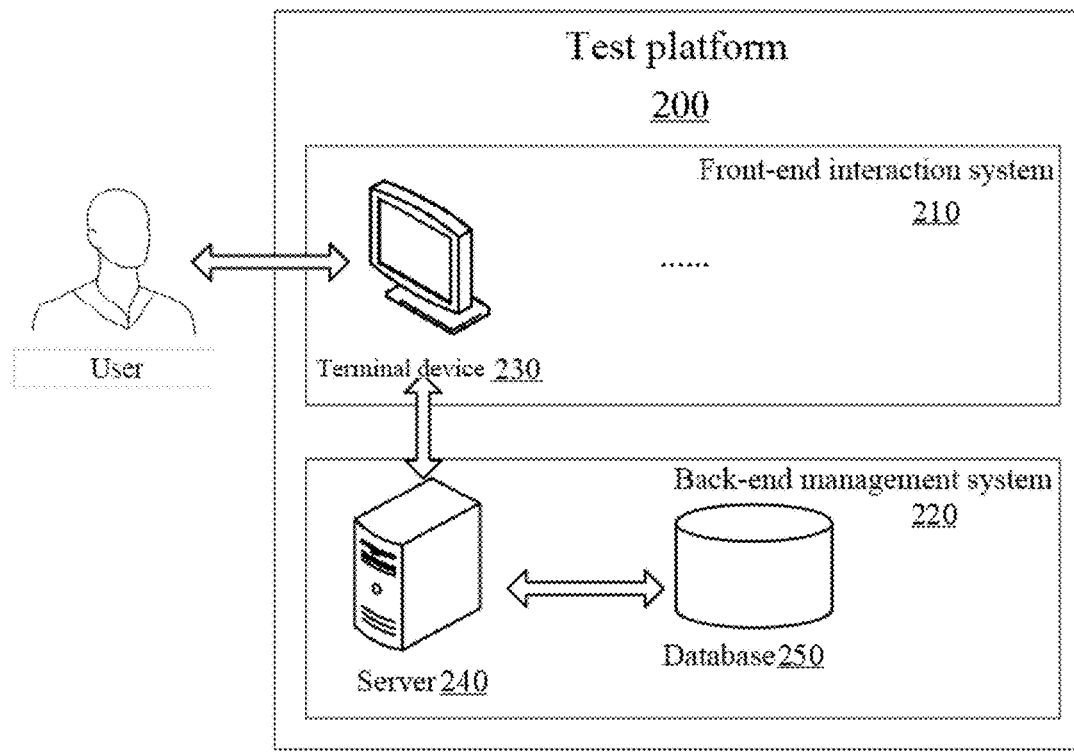
FIG. 2 is a schematic diagram of an architecture of a test platform according to the present disclosure.

The simulation carrier model files and the handling device system parameters may be input by a user through a terminal device in the front-end interaction system of the test platform shown in FIG. 2, that is, customized by the user, and may be determined according to product parameters of existing physical products such as a physical carrier, a physical handling device and a physical sensor pre-entered in the back-end management system of the test platform, and an actual working scenario. This is not limited in the present disclosure.

In one or more embodiments of the present disclosure, the handling device system parameters may include at least sensor parameters and handling device parameters. The simulation sensor described by the sensor parameter is configured on the simulation handling device model described by the handling device parameter, and the specific configuration position may be in a vehicle body part or an accessory part of the simulation handling device model. For a simulation handling device model, the number of simulation sensors configured thereon, the configuration pose, and the sensor parameters corresponding to each of the simulation sensors may be flexibly determined based on a specific test tasks (use cases). This is not specifically limited here.

In the present disclosure, the simulation handling device model described by the handling device parameter may include any one of an automated guided vehicle (AGV), an autonomous mobile robot (AMR), a humanoid robot, a forklift, a reach truck, a stacker, a tow tractor, and the like. The handling device parameters may include data used to describe a simulation handling device model, such as an identifier of the handling device, a size of the handling device (a width, a length and a height of the handling device), a size of an accessory (such as a length, a width and a thickness of a fork), a height of a support leg, a gantry pose of the handling device, and a pose of the accessory. Based on the handling device parameters, a simulation handling device model with a specific shape and size may be constructed, and applied to the simulation test for a to-be-tested perception algorithm, which can simulate a physical handling device in the real scenario.

The sensor parameters may include an identifier of a simulation sensor, a type of the simulation sensor, extrinsic parameters of the simulation sensor (i.e., the configuration pose of the simulation sensor on the simulation handling device model), and intrinsic parameters of the simulation sensor. The type of the simulation sensor includes any existing type of sensor that may acquire point cloud data, such as a radar sensor (for example, a laser radar and a millimeter wave radar), a stereoscopic vision camera, and an ultrasonic sensor.

S102: Determining test cases according to the handling device system parameters and the simulation carrier model files.

Further, to perform simulation test on the to-be-tested perception algorithm, a simulation carrier model may be placed in a simulation coordinate system, so as to generate a simulation carrier point cloud at least containing the simulation carrier model in the simulation coordinate system. The simulation coordinate system is a reference frame used to define and describe the position, pose, and motion of a simulation model (including at least a simulation carrier model, a simulation handling device model, and a simulation sensor) in a computer simulation environment provided by the test platform. The type, shape and size of the simulation carrier model placed in the simulation coordinate system, as well as a simulation scenario to be constructed, may be determined based on test cases. Based on this, the test cases may be generated from the handling device system parameters and the simulation carrier model files pre-acquired in step S100. The number of simulation carrier model files and the number of handling device system parameters contained in each of the test cases are not limited in the present disclosure.

In one or more embodiments of the present disclosure, each test case includes at least one simulation carrier model file and a set of handling device system parameters, wherein the set of handling device system parameters may contain at least one set of handling device parameters and at least one set of sensor parameters. That is, when the to-be-tested perception algorithm is tested based on a test case, at least one simulation handling device model and one simulation carrier model are placed in the simulation coordinate system, and at least one simulation sensor is placed on the simulation handling device model. In different test cases, at least one of the simulation carrier model files or the handling device system parameters is different. This may avoid repeated testing of the to-be-tested perception algorithm based on the same simulation carrier model, the same handling device system parameters, and the same sensor parameters in the simulation test, thereby improving the test efficiency.

In actual applications, since the number of the simulation carrier model files and the handling device system parameters pre-acquired by the test platform is large, the scale of the generated test cases with different contents is still large based on all the simulation carrier model files and all the handling device system parameters which are recorded by the test platform. Therefore, a user may execute the generation of the test case by a front-end interaction system of the test platform based on a specific test requirement. Then, the user selects at least one simulation carrier model file from the simulation carrier model files and selects at least one set of handling device system parameters from the sets of handling device system parameters. The front-end interaction system may generate a test case meeting a test requirement of the user based on the selection of the user. In addition, a plurality of test cases may be generated based on one-time selection of a user. Specifically, the user may execute the generation of a test task by a front-end interaction system of the test platform, so that the test platform may generate the test task based on the simulation carrier model files and the handling device system parameters selected by the user, and obtain a plurality of test cases by traversing the simulation carrier model files and the handling device system parameters contained in the test task and performing permutation and combination on these files and parameters.

S104: Generating simulation carrier point clouds corresponding to the test cases.

The test method provided by the present disclosure is used to test the precision of the to-be-tested perception algorithm in identifying a pose of a carrier relative to a handling device from point cloud data, so that the simulation carrier point clouds corresponding to each test case may be generated, and the simulation carrier point clouds corresponding to the test cases may be used as the test point clouds to perform simulation test on the to-be-tested perception algorithm.

Specifically, for each test case, a simulation handling device model is constructed according to handling device parameters in handling device system parameters contained in the test case, and is placed in a simulation coordinate system. According to the sensor parameters in the handling device system parameters contained in the test case, the simulation sensor is deployed on the placed simulation handling device model. Afterward, the simulation carrier model is placed in the simulation coordinate system according to the simulation carrier model file contained in the test case. It should be noted that the foregoing is only an optional placement order of the simulation models. The placement order of the simulation models is not limited in the present disclosure, the simulation carrier model may be placed on the simulation handling device model, or may be placed near the simulation handling device model instead of on the simulation handling device model. The placement relationship between the simulation carrier model and the simulation handling device model is not limited in the present disclosure.

In the simulation coordinate system, the pose of the simulation carrier model may be a default initial pose or a transformed pose adjusted automatically or manually by a user. Similarly, the pose of the simulation handling device model may be a default initial pose or a transformed pose transformed automatically or adjusted manually by a user. Then, according to the pose of the simulation handling device model and the pose of the simulation carrier model, a reference relative pose of the simulation carrier model relative to the simulation handling device model is determined. With the simulation sensor deployed on the simulation handling device model and the reference relative pose of the simulation carrier model relative to the simulation handling device model, the point cloud data generation simulation is started to simulate the process of a physical sensor scanning a physical carrier to obtain the simulation carrier point cloud. Compared with the current solution of acquiring a physical carrier point cloud as a test point cloud by a physical sensor, the efficiency of acquiring a simulation carrier point cloud is greatly improved since the simulation carrier point cloud is automatically generated by simulation, and the time cost and the labor cost are reduced simultaneously, so that the test efficiency of the to-be-tested perception algorithm is improved.

Meanwhile, since the reference relative pose of the simulation carrier model relative to the simulation handling device model in the present disclosure is automatically calculated in the simulation coordinate system, compared with the actual pose of the physical carrier relative to the physical handling device measured manually in the current test process, the accuracy of the reference relative pose obtained in the simulation coordinate system is higher, and the error is smaller, so that the reliability of the simulation test result of the to-be-tested perception algorithm is improved, and the test efficiency of the simulation test is improved.

The generated simulation carrier point cloud, the test case, and the reference relative pose of the simulation carrier model relative to the simulation handling device model when generating the simulation carrier point cloud are bound and stored in a database. Therefore, when the test case is called to test the to-be-tested perception algorithm, the simulation carrier point cloud corresponding to the test case may be queried to serve as the test point cloud, and the reference relative pose of the corresponding simulation carrier model relative to the simulation handling device model may be queried to serve as a reference, so that the precision and the accuracy of the to-be-tested perception algorithm in identifying the pose may be evaluated.

Optionally, if only the simulation carrier model and the simulation handling device model are placed in the simulation coordinate system, the simulation environment may be over-idealized, and further, the problem that the to-be-tested perception algorithm has good performance in the idealized test environment but poor performance in the actual working environment when encountering complex situations may occur. In view of the above situation, when generating the simulation carrier point cloud, a simulation environment used to simulate an actual working environment may be constructed according to the simulation scenario parameters in the handling device system parameters. For example, a plurality of simulation obstacles with different shapes, sizes and positions may be placed in a certain range near the simulation handling device model and the simulation carrier model in the simulation coordinate system. Therefore, the generated simulation carrier point cloud contains information of a simulation environment (such as point cloud of partial simulation obstacles), so that the to-be-tested perception algorithm needs to identify a simulation carrier model and determine a pose of the simulation carrier model from the simulation carrier point cloud containing the information of the simulation environment. The precision and the accuracy of the to-be-tested perception algorithm in a complex environment may be verified based on a simulation test result, and the to-be-tested perception algorithm may be ensured to cope with various complex situations in an actual working environment.

S106: In response to a simulation test request, calling a target test case in the test cases, and performing simulation test on a to-be-tested perception algorithm according to a simulation carrier point cloud corresponding to the target test case to obtain a simulation test result of the to-be-tested perception algorithm.

The user may select a to-be-tested perception algorithm by the front-end interaction system of the test platform and select a target test case adopted by the test from the generated test cases. Certainly, the user may also select a target test case automatically from the generated test cases based on an actual test situation of the test platform. The front-end interaction system may generate a simulation test request based on the target test case and the to-be-tested perception algorithm selected by the user, and send a simulation test request to the rear-end management system of the test platform. In response to the simulation test request, the back-end management system parses the to-be-tested perception algorithm and the target test case adopted by the test from the simulation test request, and may search the parameters of the to-be-tested perception algorithm and the information of the target test case from the database, so as to perform the simulation test on the to-be-tested perception algorithm according to the simulation carrier point cloud corresponding to the target test case and obtain the corresponding simulation test result.

If a plurality of target test cases are used to perform simulation test on the to-be-tested perception algorithm in a simulation test, the simulation carrier point cloud corresponding to each of the target test cases may be used one by one to perform simulation test on the to-be-tested perception algorithm, and the simulation test results of the to-be-tested perception algorithm under the target test cases may be obtained. The simulation test results of the to-be-tested perception algorithm under the target test cases may be analyzed comprehensively to obtain quantitative indicators for characterizing the precision and accuracy of the to-be-tested perception algorithm.

The to-be-tested perception algorithm may be any existing type of algorithm used to understand environmental information according to point cloud data acquired by a sensor, such as a laser radar perception algorithm and a millimeter-wave radar perception algorithm. In addition, different to-be-detected perception algorithms may also obtain the pose of the carrier relative to the handling device by detecting different features of the carrier, such as a pier hole detection algorithm and a plug hole detection algorithm. The type of to-be-tested perception algorithm, the features of the detected carrier, and the number of detected carriers actually adopted in the test are specifically limited in the present disclosure.

In the present disclosure, the to-be-tested perception algorithm may identify a carrier from the point cloud data and determine a position and a pose of the carrier relative to the handling device, so as to complete a task of identifying and positioning the carrier, and further assist the handling device in completing subsequent tasks such as movement, handling, and stacking of the carrier.

In the present disclosure, a to-be-tested perception algorithm is simulated through a test platform, and a target relative pose of a simulation carrier model relative to a simulation handling device model is identified from a simulation carrier point cloud corresponding to a target test case. In this process, the to-be-tested perception algorithm identifies the simulation carrier point cloud within a certain range of the target point (for details, please refer to the third defect of the aforementioned existing solution). However, according to the test method provided in the present disclosure, even if a plurality of sets of simulation carrier point clouds with different reference relative poses are adopted to perform simulation tests on the to-be-tested perception algorithm, after the simulation test based on the previous sets of simulation carrier point clouds and before the simulation test based on the next set of simulation carrier point clouds, the test platform may automatically change a target point used by the to-be-tested perception algorithm based on the next set of simulation carrier point clouds without manual modification by a user, and the to-be-tested perception algorithm may be ensured to normally identify the next set of simulation carrier point clouds, so that the efficiency of the simulation tests is improved, and the threshold of the simulation tests is reduced.

The simulation test result may characterize the precision and accuracy of the to-be-tested perception algorithm under the target test case. Since a plurality of target test cases are adopted for the simulation test of the to-be-tested perception algorithm, the identification precision and accuracy of the to-be-tested perception algorithm under the conditions of simulation carrier models of different types, shapes and sizes may be tested by the test method provided by the present disclosure, thereby avoiding the impact on the comprehensiveness of the test of the to-be-tested perception algorithm due to the limited types, shapes and sizes of physical carriers.

After the simulation test result of the to-be-tested perception algorithm is obtained, the precision and the accuracy of the to-be-tested perception algorithm may be analyzed based on the simulation test result, and whether the to-be-tested perception algorithm needs to be adjusted and optimized or not is judged. Certainly, the to-be-tested perception algorithm may be tested a plurality of times based on a plurality of different target test cases, so as to iteratively adjust the to-be-tested perception algorithm until the precision and accuracy of the to-be-tested perception algorithm reach expectations.

Based on the test method shown in FIG. 1, the handling device system parameters and the simulation carrier model files are pre-acquired, the simulation carriers model files contain simulation carrier models and carrier parameters, and the simulation carrier models contained in different simulation carrier model files are not exactly the same, and the parameters of the carriers are different. According to the simulation carrier model files and the handling device system parameters, the test cases are determined, and the simulation carrier point clouds corresponding to the test cases are generated. When the simulation test is performed, the to-be-tested perception algorithm is simulated and tested according to the simulation carrier point cloud corresponding to the target test case to obtain the simulation test results.

It can be seen from the above method that the simulation carrier point clouds corresponding to the simulation carrier models of different shapes and sizes may be obtained by constructing a plurality of simulation carrier model files with different simulation carrier models and different carrier parameters, so that the simulation carrier models with various shapes and sizes are used to test the to-be-tested perception algorithm, and the identification precision and accuracy of the to-be-tested perception algorithm on carriers with different shapes and sizes are effectively verified. In addition, the entire simulation test process does not require manual operation, which greatly reduces the waste of manpower and time, improves test efficiency, and reduces test costs.

In one or more embodiments of the present disclosure, to expand the test data, the handling device system parameters pre-acquired in step S100 may include pose transformation strategies and/or simulation scenario parameters in addition to the handling device parameters and the sensor parameters, so that different test cases generated in step S102 may contain different pose transformation strategies and/or different simulation scenario parameters, and a simulation carrier point cloud may be acquired when the simulation carrier model is in different poses relative to the simulation handling device model and/or in different simulation scenarios.

The pose transformation strategy is used to indicate to transform the pose of the simulation handling device model or the pose of the simulation carrier model in the simulation coordinate system, so as to determine the reference relative pose of the simulation carrier model relative to the simulation handling device model in the simulation coordinate system. In this way, by changing the pose of the simulation handling device model or the pose of the simulation carrier model, different reference relative poses of the simulation carrier model relative to the simulation handling device model are obtained, and the simulation carrier point cloud under different reference relative poses is obtained and used to test the to-be-tested perception algorithm. In general, the pose transformation strategy may include a first pose transformation strategy to transform the pose of the simulation handling device model and a second pose transformation strategy to transform the pose of the simulation carrier model. Of course, the pose transformation strategy may also include a transformation strategy that transforms the pose of the simulation handling device model as well as the pose of the simulation carrier model. Compared with the solution that the pose of the physical carrier relative to the physical handling device is manually measured in the current test process to serve as the actual pose, the pose transformation strategy in the present disclosure is used to automatically adjust the simulation carrier model and the simulation handling device model to obtain the reference relative pose, so that the accuracy of the reference relative pose is achieved while the efficiency of determining the reference relative pose is improved, the pose measurement error caused by manual measurement is avoided, and the stability and the efficiency of the simulation test are improved.

The simulation scenario parameters are used to describe a simulation working environment where the simulation carrier model is located. The simulation scenario parameters may include specific test requirements in the simulation work scenario, such as the fork lifting height, and the attribute information of the simulation work scenario, such as the attribute information and terrain features of the simulation ground where the simulation carrier model and the simulation handling device model are located, the climate and lighting conditions in the simulation work environment, and the object parameters of static obstacles or dynamic obstacles contained in the simulation work environment.

Based on this, step S102 may actually be as follows: determining test cases according to the simulation carrier model files and one or more of the handling device parameters, the sensor parameters, the simulation scenario parameters and the pose transformation strategies contained in the handling device system parameters. Considering that the generation process of the simulation carrier point cloud needs to simulate the real process of the real point cloud, in addition to the simulation carrier model file, at least the handling device parameters and the sensor parameters in the handling device system parameters are also needed, and thus, in an alternative embodiment of the present disclosure, step S102 may actually be as follows: determining test cases at least according to the simulation carrier model files as well as the handling device parameters and the sensor parameters contained in the handling device system parameters. The simulation scenario parameters and the pose transformation strategies contained in the handling device system parameters are further options based on the above. At least one of the simulation carrier model files, the handling device parameters, the sensor parameters, the simulation scenario parameters and the pose transformation strategies contained in different test cases are different. The determination of test cases in step S102 shown in FIG. 1 may be implemented by specifically referring to the following implementations:

First, at least one simulation carrier model file is selected from the simulation carrier model files, and at least one set of handling device system parameters is selected from the handling device system parameters.

Specifically, the back-end management system of the test platform may automatically select at least one simulation carrier model file from the simulation carrier model files according to a preset selection rule based on the pre-acquired simulation carrier model files and the pre-acquired handling device system parameters. Then, at least one set of handling device system parameters is automatically selected from the pre-acquired handling device system parameters according to the same preset selection rule, wherein the set of handling device system parameters at least contains at least one set of handling device parameters selected from the handling device parameters and at least one set of sensor parameters selected from the sensor parameters. Based on this, optionally, at least one set of simulation scenario parameters may be automatically selected from the simulation scenario parameters according to the same preset selection rule, and/or at least one set of pose transformation strategies may be automatically selected from the pose transformation strategies. Then, based on the selected simulation carrier model file and the selected handling device system parameters, the test task or test case is determined.

The preset selection rule adopted to select the files or the parameters may be preset by a user according to specific test requirements and a test scenario. For example, the selection rule is based on the order of entry time or based on the ascending order of the number of times selected, or may be all files and parameters acquired by the test platform being used as selected files and selected parameters. This is not limited in the present disclosure.

In addition, the test platform may also display the simulation carrier model files and the handling device system parameters pre-acquired by the test platform to the user through the front-end interaction system, and guide the user to make a selection, which may be specifically achieved through the following implementations:

Firstly, a front-end interaction system of a test platform displays a task construction interface containing a task generation control.

Optionally, in addition to the task generation control, at least part of information of the generated test task, such as a task identifier, a simulation carrier model file contained in the test task, a handling device parameter, a sensor parameter, a simulation scenario parameter and a pose transformation strategy, may be displayed on the task construction interface, thereby prompting the user to select a file and a parameter that are not exactly the same, so as to avoid the test task generated based on the user selection being exactly the same as the test task that has been generated.

Figure 3:
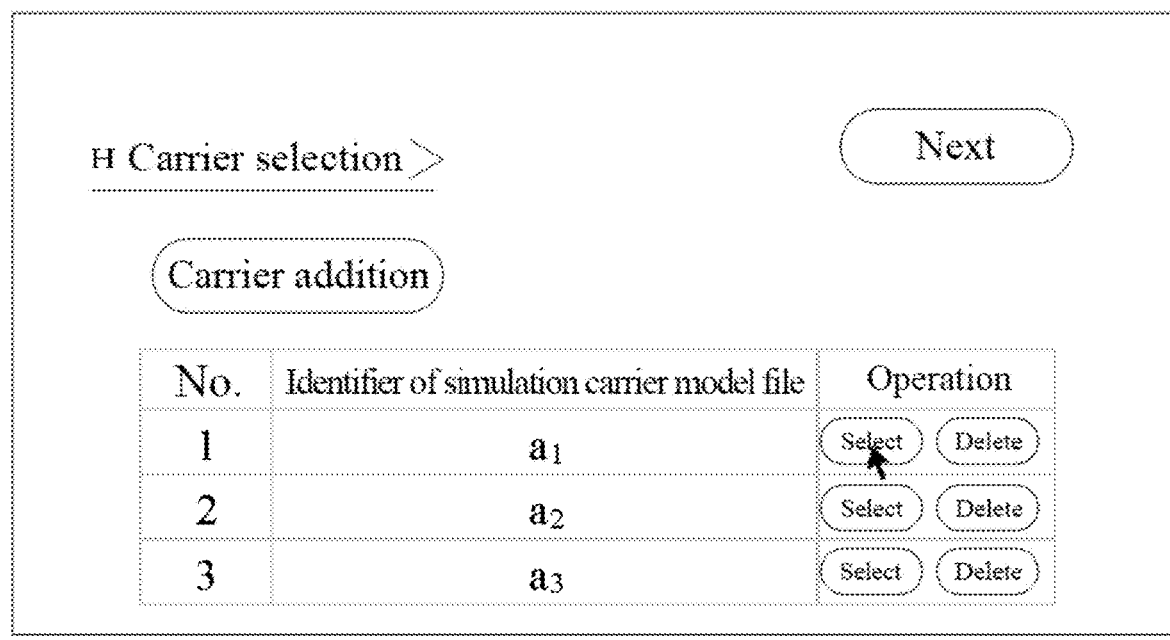
FIG. 3 is a schematic diagram of a carrier selection interface according to the present disclosure.

Next, the front-end interaction system skips to display a carrier selection interface in response to the operation of the user on the task generation control, as shown in FIG. 3, which is an optional schematic diagram of a carrier selection interface. The carrier selection interface displays identifiers of simulation carrier model files pre-acquired by the test platform, and contains a carrier selection control labeled with a guide text of "select" and a first skip control labeled with a guide text of "next step". At least one selected simulation carrier model file from the displayed simulation carrier model files is determined in response to the operation of the user on the carrier selection control. In addition, the carrier selection interface also contains a carrier adding control. The information of the entered simulation carrier model files and a file importing control are displayed in response to the operation of a user on the carrier adding control, and the user can input other simulation carrier model files different from the entered simulation carrier model files by the file importing control.

Figure 4:
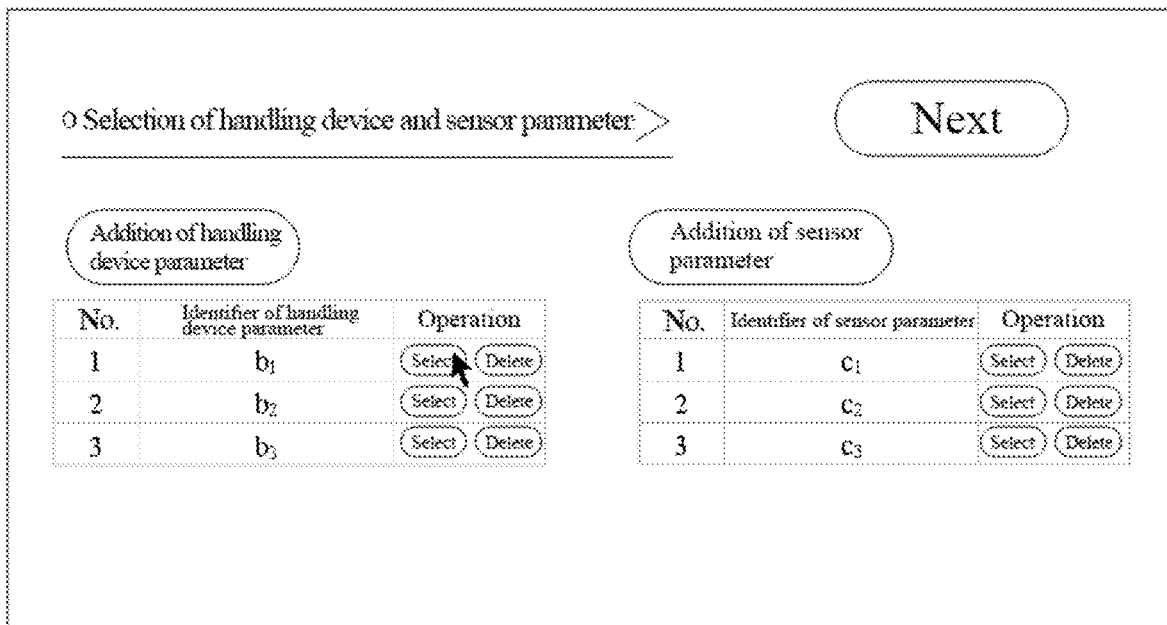
FIG. 4 is a schematic diagram of a handling device and a sensor parameter selection interface according to the present disclosure.

Then, in response to the operation of the user on the first skip control, a handling device and sensor parameter selection interface is displayed, as shown in FIG. 4, which is an optional schematic diagram of the handling device and sensor parameter selection interface. The handling device and sensor parameter selection interface displays the handling device parameters and the sensor parameters pre-acquired by the test platform, and contains a handling device parameter selection control labeled with a guide text of "select", a sensor parameter selection control labeled with a guide text of "select", and a second skip control labeled with a guide text of "next". At least one set of the handling device parameters selected from the displayed handling device parameters is determined in response to the operation of a user on a handling device parameter selection control. At least one set of sensor parameters selected from the displayed sensor parameters is determined in response to the operation of a user on a sensor parameter selection control. In addition, a handling device and sensor parameter selection interface may also contain a handling device parameter adding control and a sensor parameter adding control, a user may input other handling device parameters different from the entered handling device parameters by the handling device parameter adding control, and the user may input other sensor parameters different from the entered sensor parameters by the sensor parameter adding control.

Figure 5:
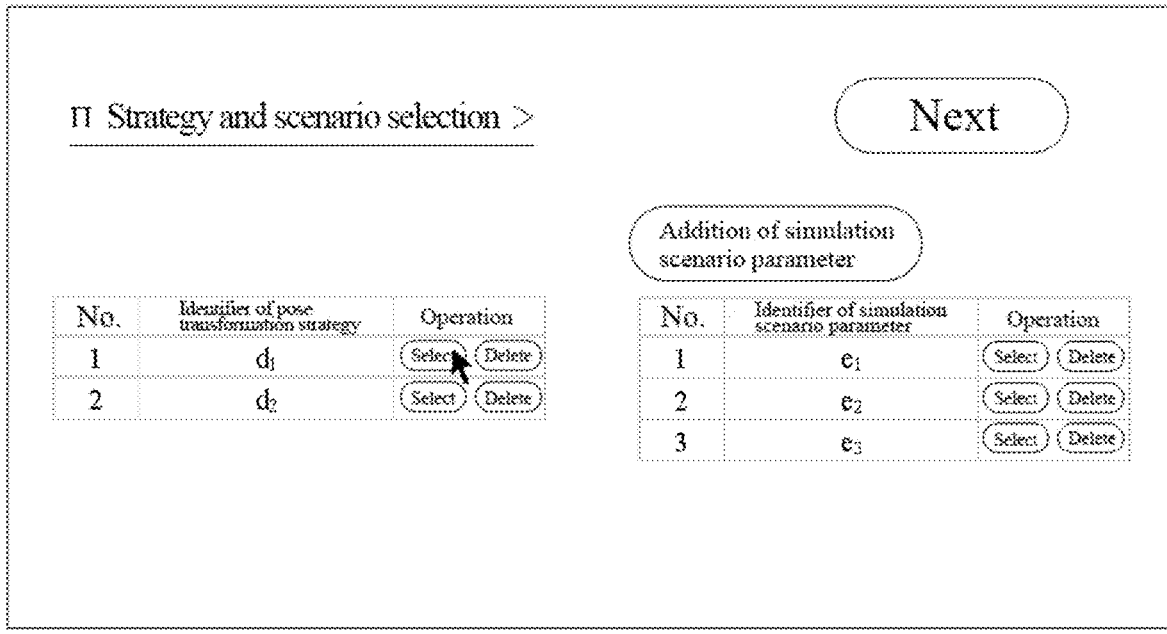
FIG. 5 is a schematic diagram of a strategy and scenario selection interface according to the present disclosure.

Then, in response to the operation of the user on the second skip control, a strategy and scenario selection interface is displayed, as shown in FIG. 5, which is an optional schematic diagram of the strategy and scenario selection interface. The strategy and scenario selection interface displays the pose transformation strategies and the simulation scenario parameters pre-acquired by the test platform, and contains a pose transformation strategy selection control labeled with a guide text of "select" and a simulation scenario parameter selection control labeled with a guide text of "select". At least one set of pose transformation strategies selected from the displayed pose transformation strategies is determined in response to the operation of a user on the pose transformation strategy selection control. At least one set of simulation scenario parameters selected from the displayed simulation scenario parameters is determined in response to the operation of a user on the simulation scenario parameter selection control. In addition, a strategy and scenario selection interface may also contain a simulation scenario parameter adding control, and a user may input other simulation scenario parameters different from the entered simulation scenario parameters by the simulation scenario parameter adding control.

Step II: A test task is generated according to the selected simulation carrier model files and the selected handling device system parameters.

The front-end interaction system of the test platform may send the information of the selected simulation carrier model files and the information of the selected handling device system parameters to the rear-end management system, and the rear-end management system generates a test task based on the selected simulation carrier model files and the selected handling device system parameters.

Figures 6, 7, 8:
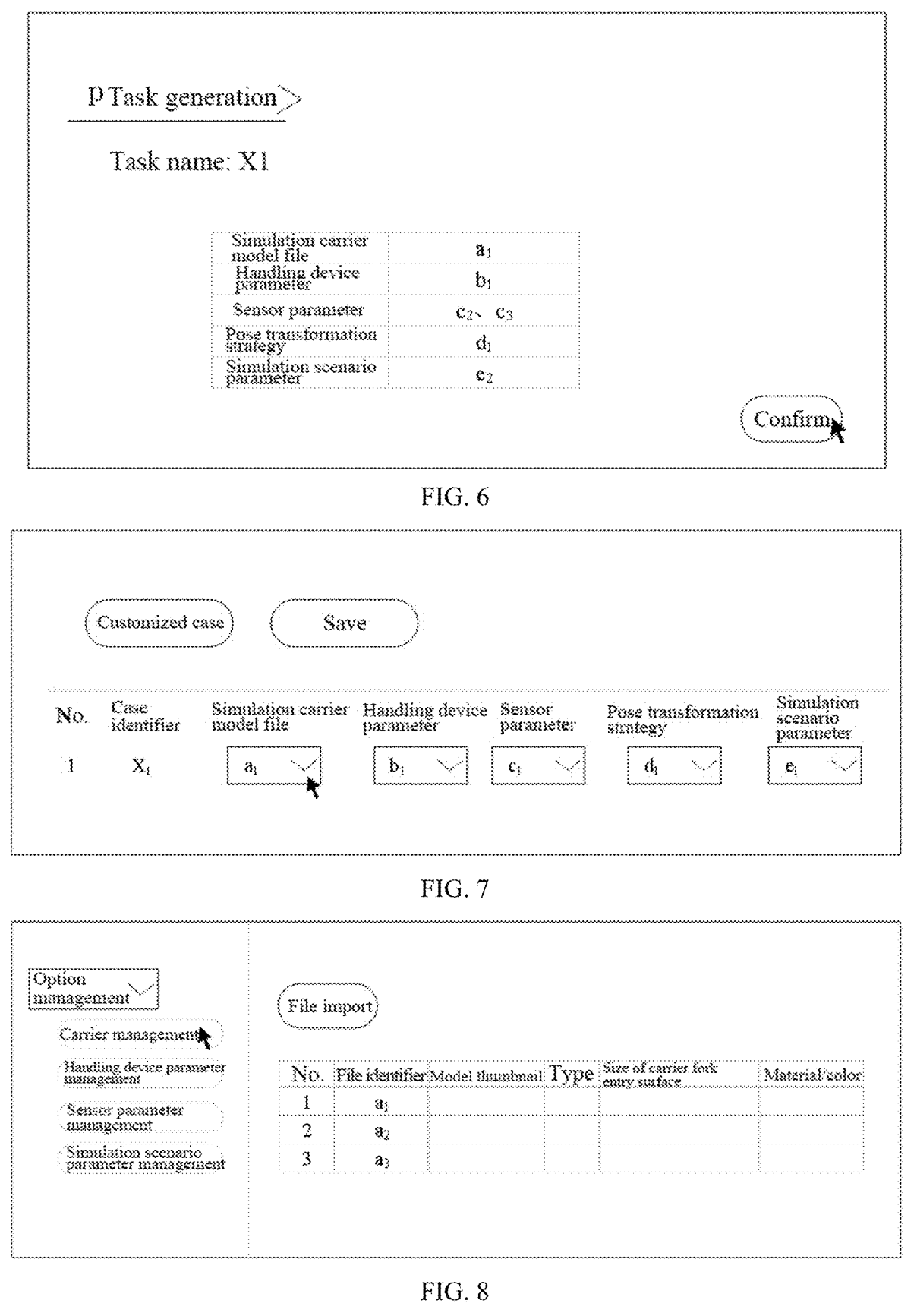

Optionally, a third skip control labeled with a guide text of "next" is displayed on the strategy and scenario selection interface by the front-end interaction system. In response to the operation of a user on the third skip control, a task generation interface is displayed, as shown in FIG. 6, which is an optional schematic diagram of a task generation interface. The selected simulation carrier model file $a_1$, the selected handling device parameter $b_1$, the selected sensor parameters $c_2$ and $c_3$, the selected simulation scenario parameter $e_2$ and the selected pose transformation strategy $d_1$ are displayed. In response to a confirmation operation input by a user, a test task generation request is determined according to the selected simulation carrier model file, the selected handling device parameter, the selected sensor parameter, the selected simulation scenario parameter and the selected pose transformation strategy, the test task generation request is sent to the back-end management system, and in response to the test task generation request, the back-end management system generates a test task according to the simulation carrier model files, the handling device parameters, the sensor parameters, the simulation scenario parameters and the pose transformation strategies parsed from the test task generation request.

Step III: The simulation carrier model file and the handling device system parameters contained in the test task are subjected to permutation and combination to obtain test cases corresponding to the test task.

At least one of the simulation carrier model files, the handling device parameters, the sensor parameters, the simulation scenario parameters and the pose transformation strategies contained in different test cases corresponding to the same test task is different.

Specifically, when a test task contains a plurality of simulation carrier model files, a plurality of sets of handling device parameters, a plurality of sets of sensor parameters, a plurality of sets of simulation scenario parameters, and a plurality of pose transformation strategies, the execution of the test task is explained by testing the to-be-tested perception algorithm in a plurality of different simulation scenarios and with different pose transformation strategies based on a plurality of different simulation carrier models, a plurality of different simulation handling device models and a plurality of simulation sensors. Therefore, various test cases corresponding to the test tasks may be traversed by permutation and combination, and thus, various test cases corresponding to the test tasks are generated.

Therefore, in the present disclosure, the determined test case contains the simulation carrier model files and the handling device system parameters, and the handling device system parameters in the test case may contain at least the handling device parameters and the sensor parameters, so as to construct the simulation carrier models and the simulation handling device models in the simulation coordinate system, and deploy the simulation sensors on the simulation handling device models. Based on this, the handling device system parameters in the test case optionally contain simulation scenario parameters and/or pose transformation strategies. Therefore, the following four situations exist for the handling device system parameters contained in the test case: firstly, the handling device system parameters in the test case contain handling device parameters and sensor parameters; secondly, the handling device system parameters in the test case contain handling device parameters, sensor parameters and simulation scenario parameters; thirdly, the handling device system parameters in the test case contain handling device parameters, sensor parameters and pose transformation strategies; and fourthly, the handling device system parameters in the test case contain handling device parameters, sensor parameters, simulation scenario parameters and pose transformation strategies.

In addition, at least one of the simulation carrier model files, the handling device parameters, the sensor parameters, the simulation scenario parameters and the pose transformation strategies contained in different test cases are different, so as to avoid generating the same simulation carrier point cloud based on the same test case, resulting in a waste of computing resources.

For example, a test case $X_1$ contains a simulation carrier model file $a_1$, a handling device parameter $b_1$, sensor parameters $c_2$ and $c_3$, a simulation scenario parameter $e_2$, and a pose transformation strategy $d_1$, a test case $X_2$ contains a simulation carrier model file $a_3$, a handling device parameter $b_2$, a sensor parameter $c_1$, a simulation scenario parameter $e_2$, and a pose transformation strategy $d_1$, and the test case $X_1$ and the test case $X_2$ are different in all of the simulation carrier model file, the handling device parameter and the sensor parameters, and are the same only in the pose transformation strategy and the simulation scenario parameter. However, if there is a test case $X_3$ containing a simulation carrier model file $a_1$, a handling device parameter $b_1$, sensor parameters $c_2$ and $c_3$, a simulation scenario parameter $e_2$, and a pose transformation strategy $d_1$, it is obvious that the test case $X_1$ and the test case $X_3$ contain the same file and parameters, and then the test case $X_1$ or the test case $X_3$ may be deleted to avoid the retesting.

In an optional embodiment of the present disclosure, since the above solution of determining the test tasks and generating the test cases by permutation and combination may result in too many test cases, testing the to-be-tested perception algorithms one by one based on the too many test cases may improve the coverage and comprehensiveness of the test. However, this not only takes a long time to execute the test and wastes test resources, but may also increase the cost of test case maintenance and make it difficult to analyze a large number of simulation test results. Therefore, the step S102 may be implemented according to the following implementations:

Firstly, in response to a selection operation of a user, a selected simulation carrier model file is selected from the simulation carrier model files, and at least one set of selected handling device system parameters is selected from the handling device system parameters; wherein the set of selected handling device system parameters contains at least one set of handling device parameters and at least one set of sensor parameters.

Specifically, the front-end interaction system of the test platform may guide the user to select a specific simulation carrier model file and a specific handling device system parameter, such as one or more of a handling device parameter, a sensor parameter, a simulation scenario parameter, and a pose transformation strategy in the handling device system parameters by displaying a test case customization interface, so as to generate a small number of test cases meeting the test requirements. Therefore, the number of test cases is reduced, and the test requirement is covered, so that the test efficiency is improved, and the test cost is reduced. For example, the front-end interaction system of the test platform may display a test case customization interface, a customization case control is displayed on the test case customization interface, and a user may execute a test case customization process by interacting with the customization case control, such as clicking.

Further, in response to the operation of a user on the customization case control, the front-end interaction system of the test platform may display the simulation carrier model files and the handling device system parameters pre-acquired in the test case customization interface, where the displayed handling device system parameters at least includes the handling device parameters and the sensor parameters. In addition, optionally, the displayed handling device system parameters may also contain the simulation scenario parameters and/or the pose transformation strategies. The simulation carrier model files and the handling device system parameters may be displayed on one page or a plurality of pages. This is not limited in the present disclosure.

FIG. 7 is an alternative schematic diagram of a test case customization interface, where the user may select the simulation carrier model files and the handling device system parameters by selecting the identifier in an option box. In response to an operation of a user, the front-end interaction system of the test platform may determine the simulation carrier model files and handling device system parameters selected by the user. The set of selected handling device system parameters contain at least one set of selected handling device parameters and at least one set of selected sensor parameters, and therefore the test case is generated.

Then test cases are generated according to the selected simulation carrier model file and the selected handling device system parameters.

The front-end interaction system may send the selected simulation carrier model file and the selected handling device system parameters to the back-end management system, the back-end management system generates the test cases according to the selected simulation carrier model file and the selected handling device system parameters, and the generated test cases are recorded in a test case table pre-established in a database of the back-end management system.

In one or more embodiments of the present disclosure, based on the selected simulation carrier model file and the selected handling device system parameters, whether generating a test task or directly generating a test case, the determined selected handling device system parameters may contain at least one set of simulation scenario parameters and/or at least one set of pose transformation strategies in addition to at least one set of handling device parameters and at least one set of sensor parameters. The test cases meeting different test requirements may be obtained by flexibly selecting simulation carrier model files and handling device system parameters, so that multi-directional and multi-angle simulation tests may be performed on the to-be-tested perception algorithm, and comprehensive and reliable simulation test results of the to-be-tested perception algorithm may be obtained.

In an optional embodiment of the present disclosure, a test task table and a test case table may be pre-established in a database of a back-end management system of the test platform. The test task table records task information corresponding to the test tasks, where the task information includes task identifiers, identifiers of the simulation carrier model files contained in the test task, handling device parameters, sensor parameters, simulation scenario parameters and pose transformation strategies. The test case table records case information corresponding to the test cases, wherein the case information includes use case identifiers, identifiers of the test tasks to which the test cases belong, identifiers of the simulation carrier model files contained in the test cases, handling device parameters, sensor parameters, simulation scenario parameters, and pose transformation strategies.

In one or more embodiments of the present disclosure, based on the test case containing the simulation carrier model file and the handling device system parameters, and the handling device system parameters in the test case containing at least the handling device parameters and the sensor parameters, the step S104 shown in FIG. 1 may be implemented by the following implementations:

Step I: For each of the test cases, an initial pose of a simulation carrier model is determined according to the simulation carrier model and carrier parameters contained in the simulation carrier model file in the test case.

Based on the simulation carrier model and the carrier parameters contained in the simulation carrier model file in the test case, the simulation carrier model may be constructed in a simulation coordinate system. In this case, the pose of the simulation carrier model may be a default initial pose. The specific position of the initial pose of the simulation carrier model in the simulation coordinate system may be determined in a preset manner. The specific parameters of the initial pose are not limited in the present disclosure. The initial pose of the simulation handling device model in the simulation coordinate system is similar, and details are not described herein again.

Step II: An initial pose of a simulation handling device model is determined according to the handling device parameters in the test case.

Step III: A reference relative pose of the simulation carrier model relative to the simulation handling device model is determined according to the initial pose of the simulation handling device model and the initial pose of the simulation carrier model.

Further, a reference relative pose of the simulation carrier model relative to the simulation handling device model in the simulation coordinate system is determined according to a difference between the initial pose of the simulation carrier model in the simulation coordinate system and the initial pose of the simulation handling device model in the simulation coordinate system.

Optionally, when the handling device system parameters in the test case further contain a pose transformation strategy, a reference relative pose of the simulation handling device model relative to the simulation handling device model may be determined based on the initial pose of the simulation handling device model and the initial pose of the simulation carrier model with guidance of the pose transformation strategy. The pose transformation strategy is used to indicate whether to transform the pose of the simulation handling device model or the simulation carrier model. Therefore, when the handling device system parameters in the test case further contain a pose transformation strategy, according to the pose transformation strategy in the test case, the reference relative pose of the simulation carrier model relative to the simulation handling device model may be determined in the following situations:

Situation I: When the pose transformation strategy in the test case is a first pose transformation strategy, the initial pose of the simulation handling device model is transformed, and a reference relative pose of the simulation handling device model relative to the simulation handling device model is determined according to a transformed pose of the simulation handling device model and the initial pose of the simulation carrier model, especially a difference between the transformed pose of the simulation handling device model and the initial pose of the simulation carrier model.

Situation II: When the pose transformation strategy in the test case is a second pose transformation strategy, the initial pose of the simulation carrier model is transformed, and the reference relative pose of the simulation carrier model relative to the simulation handling device model is determined according to the initial pose of the simulation handling device model and a transformed pose of the simulation carrier model, especially a difference between the initial pose of the simulation handling device model and a transformed pose of the simulation carrier model.

In addition, the pose transformation strategy may also indicate to transform the pose of the simulation handling device model and the pose of the simulation carrier model. In this case, the initial pose of the simulation handling device model is transformed, the initial pose of the simulation carrier model is transformed, and the reference relative pose of the simulation carrier model relative to the simulation handling device model is determined based on the transformed pose of the simulation handling device model and the transformed pose of the simulation carrier model, especially a difference between the transformed pose of the simulation handling device model and the transformed pose of the simulation carrier model.

Step IV: A simulation carrier point cloud corresponding to the test case is generated according to the sensor parameter in the test case and the reference relative pose.

This step is similar to the step S104. Details are not described herein again.

Optionally, if the handling device system parameters in the test case further contain simulation scenario parameters, a simulation scenario may be constructed according to the simulation scenario parameters in the test case, and a simulation carrier point cloud corresponding to the test case is generated in the constructed simulation scenario. That is, when the test case contains simulation scenario parameters, the simulation carrier point cloud corresponding to the test case is generated according to the sensor parameters and the simulation scenario parameters in the test case, and the reference relative pose of the simulation carrier model relative to the simulation handling device model.

In the present disclosure, step S106 shown in FIG. 1 may be implemented by the following specific implementation:

Step I: The simulation carrier point cloud corresponding to the target test case is inputted into a to-be-tested perception algorithm, and a target relative pose of a simulation carrier model relative to a simulation handling device model in the target test case is identified and obtained from the simulation carrier point cloud corresponding to the target test case by the to-be-tested perception algorithm.

Specifically, the to-be-tested perception algorithm may extract key features capable of representing object shape and structure information from the simulation carrier point cloud, identify a simulation carrier model and a simulation handling device model based on the extracted features, and obtain an estimated pose of the simulation carrier model and an estimated pose of the simulation handling device model under a simulation coordinate system, so that a target relative pose of the simulation carrier model relative to the simulation handling device model is obtained. The above is only an optional embodiment of obtaining a target relative pose by using a to-be-tested perception algorithm. The implementation of identifying the carrier pose by using the to-be-tested perception algorithm in the present disclosure is not limited to this.

Step II: A reference relative pose of a simulation carrier model relative to a simulation handling device model in the target test case is taken as a reference, and the simulation test result of the to-be-tested perception algorithm is determined according to a difference between the target relative pose and the reference relative pose.

Then the reference relative pose of the simulation carrier model relative to the simulation handling device model in the target test case is taken as a reference, i.e., a true value, a target relative pose identified by the to-be-tested perception algorithm is taken as an estimated value, a difference between the target relative pose and the reference relative pose is determined, and a simulation test result of the to-be-tested perception algorithm is determined according to the difference.

In one or more embodiments of the present disclosure, one test case may correspond to a plurality of sets of simulation carrier point clouds, and reference relative poses of the simulation carrier models corresponding to different sets of the simulation carrier point clouds relative to the simulation handling device model vary. That is, in step S104 shown in FIG. 1, for the same test case, the same simulation carrier model, the same simulation handling device model and the same simulation sensor are used to change only the reference relative pose of the simulation carrier model relative to the simulation handling device model, and a plurality of sets of simulation carrier point clouds are acquired under a plurality of different reference relative poses.

Thus, in one or more embodiments of the present disclosure, step S106 shown in FIG. 1 may be specifically implemented by the following implementations:

Step I: For each set of simulation carrier point clouds corresponding to the target test case, the set of simulation carrier point clouds is input into a to-be-tested perception algorithm, and a target relative pose of a simulation carrier model corresponding to the set of simulation carrier point clouds relative to a simulation handling device model is identified and obtained from the set of simulation carrier point clouds by the to-be-tested perception algorithm.

Each set of simulation carrier point clouds corresponding to the target test case is identified one by one by adopting a to-be-tested perception algorithm, and the identification process may refer to the above steps. Details are not described herein again.

Step II: A reference relative pose of a simulation carrier model corresponding to the set of simulation carrier point clouds relative to a simulation handling device model is taken as a reference, and a simulation test result of the to-be-tested perception algorithm for detecting the set of simulation carrier point clouds is determined according to a difference between the reference relative pose corresponding to the set of simulation carrier point clouds and the target relative pose corresponding to the set of simulation carrier point clouds.

Step III: A simulation test result of each set of simulation carrier point clouds corresponding to the target test case is detected according to the to-be-tested perception algorithm, and the simulation test result of the to-be-tested perception algorithm is determined.

The simulation test results corresponding to the sets of simulation carrier point clouds are integrated to analyze the identification precision and accuracy of the to-be-tested perception algorithm under different reference relative poses, which provides direction for the adjustment and optimization of the to-be-tested perception algorithm.

Optionally, different sets of simulation carrier point clouds correspond to different test distances, and the test distance is defined as a distance between a carrier fork entry surface of a simulation carrier model and a center of a vehicle body of a simulation handling device model. That is, in step S104 shown in FIG. 1, for the same test case, the reference relative pose of the simulation carrier model relative to the simulation handling device model is changed by using the same simulation carrier model, the same simulation handling device model and the same simulation sensor, so that a distance between the carrier fork entry surface of the simulation carrier model and the center of the vehicle body of the simulation handling device model is changed, and thus a plurality of sets of simulation carrier point clouds are acquired under a plurality of different test distances.

Therefore, in the testing process, the target relative pose of the simulation carrier model relative to the simulation handling device model is identified from the sets of simulation carrier point clouds according to the to-be-tested perception algorithm, and the obtained simulation test result of the to-be-tested perception algorithm under the set of simulation carrier point clouds may characterize the accuracy and precision of the to-be-tested perception algorithm in identifying the set of simulation carrier point clouds under the test distance corresponding to the set of simulation carrier point clouds.

Then, the simulation test results of the sets of simulation carrier point clouds corresponding to the target test case are detected based on the to-be-tested perception algorithm, and the simulation test results of the to-be-tested perception algorithm actually characterize the precision distribution and accuracy distribution of the to-be-tested perception algorithm in identifying the pose of the simulation carrier model at a plurality of different test distances corresponding to the sets of simulation carrier point clouds contained in the target test case. Since the test distance may affect the result of identifying the carrier pose by the perception algorithm, the precision and accuracy of identifying the carrier pose by the to-be-tested perception algorithm at different test distances may be verified based on the simulation test result of identifying the carrier pose by the to-be-tested perception algorithm from the sets of simulation carrier point clouds at different test distances.

In an optional embodiment of the present disclosure, the to-be-tested perception algorithm includes a plurality of perception algorithms, and features of the detected carrier are different when different perception algorithms identify the carrier pose.

Thus, step S106 shown in FIG. 1 may be implemented by the following specific implementations:

Firstly, for each to-be-tested perception algorithm, a simulation carrier point cloud corresponding to the target test case is input into the to-be-tested perception algorithm, and a relative pose of a simulation carrier model in the target test case relative to a simulation handling device model is identified and obtained from the simulation carrier point cloud corresponding to the target test case through detecting a feature of a carrier by the to-be-tested perception algorithm, wherein the relative pose is used as a target relative pose output by the to-be-tested perception algorithm.

The to-be-tested perception algorithm may include a pallet detection algorithm, a compact pallet detection algorithm, a pier hole detection algorithm, a plug hole detection algorithm, and a cage detection algorithm. The pallet detection algorithm may determine a pallet pose by detecting features of an edge, a contour, a height and the like of the pallet. The compact pallet detection algorithm may determine a pallet pose by detecting features such as a spacing, an overlapping area and an edge detail between pallets. The pier hole detection algorithm may identify a carrier pose by detecting footrests of the carrier, the plug hole detection algorithm may identify a carrier pose by detecting plug holes of the carrier, and the cage detection algorithm may identify a cage pose by detecting the features of a cage frame structure, grids and the like. In conclusion, different to-be-tested perception algorithms may have different features in identifying the carrier; however, the results output by the algorithms are the pose of the carrier relative to the handling device.

Then, a reference relative pose of a simulation carrier model relative to a simulation handling device model in the target test case is taken as a reference, and the simulation test result of the to-be-tested perception algorithm is determined according to a difference between the target relative pose output by the to-be-tested perception algorithm and the reference relative pose.

Based on the above solution, the simulation test results of different to-be-tested perception algorithms under the same simulation test may be obtained, so that the detection precision and accuracy corresponding to the to-be-tested perception algorithms for detecting different carrier features are analyzed, which provides data support for the adjustment and optimization of the to-be-tested perception algorithm and the selection of perception algorithms in actual applications.

In an optional embodiment of the present disclosure, based on the simulation test shown in FIG. 1, the precision and accuracy of the to-be-tested perception algorithm may also be comprehensively evaluated in combination with a real test result obtained by the real test, thereby improving the accuracy of the test. The real test solution for the to-be-tested perception algorithm can refer to the following specific implementations:

Step I: A real carrier point cloud corresponding to the target test case is pre-acquired.

Since the simulation carrier point cloud is generated by simulation under the simulation coordinate system of the test platform and is not acquired by a physical sensor, the simulation carrier point cloud is generally uniform in distribution and optimal in performance. However, in actual applications, the point cloud data input to the to-be-tested perception algorithm is scanned by the physical sensor in the real working environment. Since the physical sensor is affected by various external factors of production, transportation, installation, use and the like, the point cloud data generated by scanning the environment with a physical sensor may have the problems of noise, deficiency, tailing and the like. Consequently, there is a difference between the real carrier point cloud and the simulation carrier point cloud.

Therefore, the simulation test of the to-be-tested perception algorithm based on the simulation carrier point cloud actually tests the precision and accuracy of the to-be-tested perception algorithm in an ideal environment. However, the simulation carrier point cloud is too ideal, which cannot completely reflect complexity and uncertainty in an actual working environment and may ignore detailed problems existing in a physical sensor, so that the precision and accuracy of the to-be-tested perception algorithm may be comprehensively evaluated by combining a real test based on a simulation test.

Firstly, a real carrier point cloud corresponding to a target test case is pre-acquired. The specific implementation of the acquisition may be as follows: constructing an actual test scenario that meets the simulation scenario parameters in the target test case. According to the simulation carrier model file, the handling device parameters and the sensor parameters contained in the target test case, a physical carrier that is the same or similar to the simulation carrier model in the simulation carrier model file and a physical handling device that meets the handling device parameters are placed in the actual test scenario constructed, and a physical sensor meeting the sensor parameters is placed on the physical handling device. A pose of a physical carrier and a pose of a physical handling device are adjusted by using a reference relative pose of the simulation carrier model corresponding to the simulation carrier point cloud corresponding to the target test case relative to the simulation handling device model, so that an actual relative pose of the physical carrier relative to the physical handling device is the same as the reference relative pose of the simulation carrier model corresponding to the simulation carrier point cloud relative to the simulation handling device model. Then, under the aforementioned conditions, a physical carrier is scanned by a physical sensor to obtain the real carrier point cloud corresponding to the target test case.

Step II: In response to a real test request, the to-be-tested perception algorithm is tested according to the real carrier point cloud corresponding to the target test case to obtain a real test result of the to-be-tested perception algorithm.

Similar to the aforementioned step S102, the real carrier point cloud corresponding to the target test case is input to the to-be-tested perception algorithm, the to-be-tested perception algorithm may identify the physical carrier from the real carrier point cloud and determine the estimated pose of the physical carrier relative to the physical handling device, and the real test result of the to-be-tested perception algorithm is determined based on the difference between the estimated pose output by the to-be-tested perception algorithm and the actual relative pose of the physical carrier relative to the physical handling device.

The real carrier point cloud is from the physical sensor scanning the physical carrier in the actual test scenario, so that the uncertainty of the physical sensor and the complexity of the real test scenario may be truly reflected, the real test result may reflect the identification precision and accuracy of the to-be-tested perception algorithm in the real environment, and the performance of the to-be-tested perception algorithm in the real environment may be verified.

Optionally, based on any existing statistical method, the simulation test result and the real test result of the to-be-tested perception algorithm are subjected to statistical analysis to obtain an evaluation index for representing the precision and the accuracy of the to-be-tested perception algorithm in the simulation test and an evaluation index for characterizing the precision and the accuracy of the to-be-tested perception algorithm in the real test. A test report corresponding to the to-be-tested perception algorithm is generated by integrating the evaluation index of the simulation test and the evaluation index of the real test. For the specific statistical method and the test report generation solution, reference may be made to the following implementations for generating a test report. This is not described herein again.

It should be noted that whether to perform a real test may be flexibly selected based on factors such as problems existing in the actual work of the to-be-tested perception algorithm, test requirements, or simulation test results of the to-be-tested perception algorithm. For example, when the to-be-tested perception algorithm executes a task of identifying the carrier pose in an actual working environment, the carrier pose may not be identified normally due to a complex actual working environment, for example, an unconventional obstacle exists. In this case, the user may perform a real test on the to-be-tested perception algorithm based on the real carrier point cloud by acquiring the real carrier point cloud in the actual working environment and recording the actual relative pose of the physical carrier relative to the physical handling device in the actual working environment. In addition, based on this actual working environment, the physical carrier, the physical handling device and the physical sensor in the actual working environment, a simulation carrier model file with the same model and parameters is added in the test platform, corresponding handling device parameters, sensor parameters and simulation scenario parameters are added to determine a test case, and a simulation carrier point cloud is generated, so that a simulation test is performed on the to-be-tested perception algorithm. Then, the to-be-tested perception algorithm is comprehensively evaluated by combining the real test result and the simulation test result, and the reason for the identification failure of the to-be-tested perception algorithm is determined, so that the to-be-tested perception algorithm may be adjusted and optimized.

Step III: A comprehensive test result of the to-be-tested perception algorithm is determined according to the simulation test result and the real test result.

Then the simulation test result and the real test result of the same to-be-tested perception algorithm are combined to obtain a comprehensive test result. The comprehensive test result may include fusion and comparison of the performance of the to-be-tested perception algorithm in a simulation coordinate system and the performance of the to-be-tested perception algorithm in a real environment, so that the problems possibly existing in different environments of the to-be-tested perception algorithm are determined, and the to-be-tested perception algorithm is improved so as to increase the performance of the to-be-tested perception algorithm in an actual environment.

In addition, in the comprehensive test results, a proportion of the simulation test result may be the same as or different from a proportion of the real test result. This is not limited in the present disclosure.

The test order between the simulation test based on the simulation carrier point cloud and the real test based on the real carrier point cloud is not limited in the present disclosure.

In an optional embodiment of the present disclosure, the simulation carrier model file, the handling device parameters, the sensor parameters, and the simulation scenario parameters that are pre-acquired in step S100 shown in FIG. 1 may be pre-acquired by the test platform and stored in a database of the back-end management system, where a carrier management table, a handling device parameter management table, a sensor parameter management table, a simulation scenario parameter management table, and a perception algorithm management table are pre-established in the database. The carrier management table is used to store carrier parameters and simulation carrier model thumbnails of entered simulation carrier model files, the handling device parameter management table is used to store the added groups of handling device parameters, the sensor parameter management table is used to store the added groups of sensor parameters, the simulation scenario parameter management table is used to store the added groups of simulation scenario parameters, and the perception algorithm management table is used to record to-be-tested perception algorithms.

The simulation carrier model file, the handling device parameters and the sensor parameters may be acquired by the test platform by adopting any one of the following two implementations.

Implementation I: The test platform pre-acquires a product description document of the existing physical product and determines the model or parameters based on this product description document.

Specifically, product description documents corresponding to physical carriers, physical handling devices and physical sensors may be pre-acquired. A product model of the physical carrier is extracted from a product description document of the physical carrier to construct a simulation carrier model corresponding to the physical carrier, product parameters of the physical carrier are constructed to determine carrier parameters of the simulation carrier model, and a simulation carrier model file is generated based on the simulation carrier model and the carrier parameters. Similarly, the handling device parameters may be extracted from the product description document of the physical handling device and stored, and the sensor parameters of the physical sensors may be extracted from the product description document of the physical sensor. Therefore, the back-end management system of the test platform may acquire the models or parameters of any type of existing carriers, handling devices and sensors, thereby improving the coverage of simulation tests.

Implementation II: A user inputs the models or the parameters by the front-end interaction system of the test platform.

Since the simulation test has flexibility, the models and the parameters adopted in the simulation test may not be limited by the actual situation; therefore, the models or the parameters pre-acquired by the test platform may be obtained by user definition. The user inputting the simulation carrier model file by the front-end interaction system of the test platform is taken as an example. Specifically, the user may determine a simulation carrier model such as a three-dimensional model of the simulation carrier model, and determine a size of the three-dimensional structure of the simulation carrier model according to the specific application scenario and the simulation test requirements. Then, the user may input the simulation carrier model and the size of the simulation carrier model into the front-end interaction system by a terminal device in the front-end interaction system of the test platform, so that the front-end interaction system may send the simulation carrier model and the size of the simulation carrier model input by the user to the back-end management system, and the back-end management system may generate a simulation carrier model file and store and manage the simulation carrier model file. The same goes for handling device parameters and sensor parameters.

It may be understood that, since the simulation scenario parameters do not generally correspond to the physical product, the simulation scenario parameters stored in the database are generally pre-acquired by the testing platform based on the implementation II.

Optionally, the specific implementation that the user inputs the simulation carrier model files, the handling device parameters, the sensor parameters, and the simulation scenario parameters into the front-end interaction system by the terminal device in the front-end interaction system of the test platform may be as follows:

The front-end interaction system of the test platform displays a simulation task main interface, the simulation task main interface includes option management controls, and the option management controls include a carrier management control that skips to a simulation carrier model file management interface, a handling device parameter management control that skips to a handling device parameter management interface and a sensor parameter management control that skips to a sensor parameter management interface.

In response to the operation of the user on the carrier management control, a simulation carrier model file management interface is displayed, as shown in FIG. 8, which is an optional schematic diagram of the simulation carrier model file management interface. A file importing control, a simulation carrier model thumbnail corresponding to the entered simulation carrier model files, and corresponding carrier parameters are displayed in the simulation carrier model file management interface. In response to the operation of the user on the file importing control, the simulation carrier model file input by the user is acquired.

Figures 9, 10, 11:
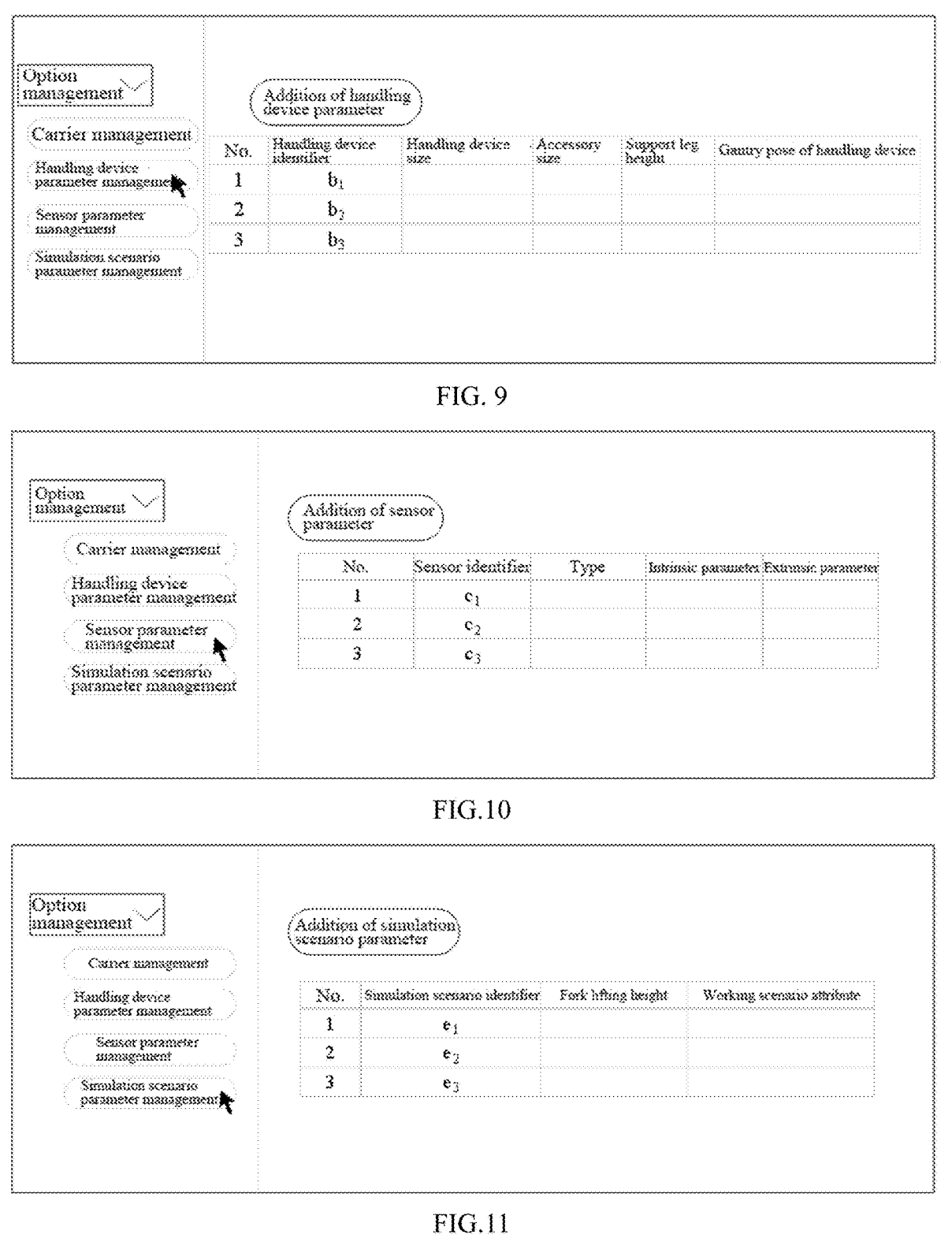

In response to the operation of the user on the handling device parameter management control, the handling device parameter management interface is displayed, as shown in FIG. 9, which is an optional schematic diagram of the handling device parameter management interface. The handling device parameter adding control and the sets of entered handling device parameters are displayed in the handling device parameter management interface, and each set of handling device parameters may include a size of the handling device, a size of the accessory, a height of the support leg, and a gantry pose of the handling device, as shown in FIG. 9. In response to the operation of the user on the handling device parameter adding control, the handling device parameters input by the user are acquired.

In response to the operation of the user on the sensor parameter management control, the sensor parameter management interface is displayed, as shown in FIG. 10, which is an optional schematic diagram of the sensor parameter management interface. The sensor parameter adding control and the sets of entered sensor parameters are displayed in the sensor parameter management interface, and each set of sensor parameters may include a sensor type, intrinsic parameters and extrinsic parameters, as shown in FIG. 10. In response to the operation of the user on the sensor parameter adding control, the sensor parameters input by the user are acquired.

In response to the operation of the user on the simulation scenario parameter management control, the simulation scenario parameter management interface is displayed, as shown in FIG. 11, which is an optional schematic diagram of the simulation scenario parameter management interface. The simulation scenario parameter adding control and the sets of entered simulation scenario parameters are displayed in the simulation scenario parameter management interface, and each set of simulation scenario parameters may include the fork lifting height and the working scenario attribute, as shown in FIG. 11. In response to the operation of the user on the simulation scenario parameter adding control, the simulation scenario parameters input by the user are acquired.

In addition, the user may input the simulation carrier model and the size thereof in a third-party software, the simulation carrier model may be a model in any shape, and the size of the simulation carrier model may be any size. This is not limited in the present disclosure. The third-party software may generate a simulation carrier model file based on the simulation carrier model and the size of the simulation carrier model input by the user, and then the user may import the simulation carrier model file generated in the third-party software into the test platform, so that the test platform may acquire the simulation carrier model file. The third-party software may be any type of existing model building software, such as SolidWorks, CAD, and ECAD. The type of third-party software and the file format of the simulation carrier model file imported into the test platform are not specifically limited in the present disclosure.

Therefore, based on the solution that the user may input the simulation carrier model and the carrier parameters in the third-party software, the user may customize the simulation carrier model with any shape and any size for simulation test, so that the user may define the simulation carrier model that is the same as a physical carrier in shape and size by the third-party software based on the real shape and the real size of the physical carrier under the condition that the physical carrier is not in a real test field. Therefore, the test does not need to be performed based on a physical carrier and is not restricted by whether the physical carrier is in a real test field, thereby improving test efficiency.

In an optional embodiment of the present disclosure, after the simulation test result of the to-be-tested perception algorithm is obtained in the embodiment shown in FIG. 1, the simulation test result may be further analyzed to obtain a test report corresponding to the to-be-tested perception algorithm, so as to visually and simply describe and explain the performance of the to-be-tested perception algorithm in the simulation test. The specific implementation is as follows:

Step I: The simulation test results of the to-be-tested perception algorithm are statistically analyzed, and a precision of the to-be-tested perception algorithm for detecting a pose of a simulation carrier model corresponding to the target test case is determined.

Specifically, the precision of the to-be-detected perception algorithm for detecting the pose of the simulation carrier model corresponding to the target test case may characterize the stability of the to-be-detected perception algorithm for identifying the pose. The high precision means that a difference between results of a plurality of detections of the to-be-detected perception algorithm under the same condition is small.

In addition, the accuracy of the pose of the simulation carrier model corresponding to the target test case detected by the to-be-tested perception algorithm may be determined according to the simulation test result. The accuracy may characterize a similarity between the pose identified by the to-be-tested perception algorithm and the reference relative pose, and the high accuracy means that an error between the pose identified by the to-be-tested perception algorithm and the reference relative pose is small.

Based on any type of existing statistical method, an evaluation index for characterizing detection precision and an evaluation index for detecting accuracy of the to-be-tested perception algorithm may be obtained, so that the precision and the accuracy of the to-be-tested perception algorithm for identifying the pose of the simulation carrier model may be objectively evaluated, and an index basis is provided for optimization and improvement of the to-be-tested perception algorithm. The statistical method may be a descriptive statistical method such as a mean, a standard deviation and a maximum value, a frequency distribution method such as a histogram and a cumulative distribution function, or a hypothesis test method such as a T test. The statistical method may be flexibly selected according to a specific application scenario and a test analysis requirement. The type and number of the statistical methods used are not limited in the present disclosure.

Step II: A test report corresponding to the to-be-tested perception algorithm is generated according to the determined precision of the to-be-tested perception algorithm for detecting the pose of the simulation carrier model corresponding to the target test case.

In addition, the precision and accuracy of the to-be-tested perception algorithm obtained based on statistical analysis may also be visualized, such as a scatter diagram, a histogram, a box line diagram and other visual charts, and a test report corresponding to the to-be-tested perception algorithm is generated to intuitively display the distribution and characteristics of the precision and accuracy of the to-be-tested perception algorithm, thereby assisting the user in comprehensively evaluating the to-be-tested perception algorithm and improving testing efficiency.

In an optional embodiment of the present disclosure, in the process of performing the simulation test on the to-be-tested perception algorithm by using the target test case in step S106 shown in FIG. 1, the back-end management system of the test platform may periodically monitor whether the simulation test based on the target test case is completed, and if yes, the front-end interaction system of the test platform may notify the user. In addition, since the time consumed for testing the to-be-tested perception algorithm based on different test cases is generally approximate, the back-end management system may also determine whether the test is overtime based on the prior test experience, so that the abnormal simulation test may be found in time. The detailed implementation may be as follows:

First, a preset query period and a preset test timeout duration are acquired.

As described above, whether there is a simulation test result may be queried at an interval of a period of time, if yes, it is indicated that the simulation test performed on the to-be-tested perception algorithm by using the target test case has ended normally. This information may be fed back to the user to prompt the user to check or analyze the simulation test result in time. If the simulation test result is not found through query, it means that the simulation test has not yet ended and further waiting is required. If the simulation test result cannot be found through query for a long time, it is likely that the simulation test is abnormal. In this case, the information that the simulation test is likely to be abnormal may be fed back to the user in time, so that the user may process the abnormal test in time.

The preset query period is used to characterize a time interval between two adjacent queries. For example, if the preset query period is 10 s, it means that a query may be performed every 10 s to determine whether there is a simulation test result of the to-be-tested perception algorithm obtained by executing the target test case. The preset test timeout duration is used to indicate the maximum allowed duration for waiting for the simulation test to complete. If the simulation test result is not found through query within the preset test timeout duration, it means that the simulation test is not completed within a certain period of time, and abnormalities and other problems may occur. For example, the preset timeout duration is 60 s, and if the simulation test result of the to-be-tested perception algorithm obtained by executing the target test case is still not found through query after 60 s from the start of the simulation, it may be considered that the simulation test has an abnormality.

Secondly, when the query period is reached, whether there is a simulation test result of the to-be-tested perception algorithm obtained by executing the target test case is queried. If syes, a test state of the target test case is updated to be completed, and the completed test state of the target test case is displayed to a user. If no, waiting is continued.

Then, when the preset test timeout duration is reached, and a query finds that there is no simulation test result of the to-be-tested perception algorithm obtained by executing the target test case, a test state of the target test case is updated to be abnormal, and the abnormal test state of the target test case is displayed to a user.

Specifically, when the query period is reached, when the query result is that there is a simulation test result of the to-be-tested perception algorithm obtained by executing the target test case, the simulation test based on the target test case is completed. Therefore, the test state corresponding to the target test case may be updated to be completed and displayed to the user so as to prompt the user to check or analyze the simulation test result. If a query finds that there is no simulation test result, waiting is continued, and polling is repeated until the execution duration of the simulation test exceeds the preset test timeout duration. If the simulation test result is still not found thorugh query in this case, the test status corresponding to the target test case may be updated to abnormal and displayed to the user to prompt the user to terminate the simulation test, handle the existing abnormal problems and reschedule the simulation test.

The present disclosure further provides a computer program product, including a computer program, and the computer program is configured to implement the test method provided in FIG. 1 when executed by a processor.

The present disclosure further provides a computer-readable storage medium, where the storage medium stores a computer program, and the computer program is configured to execute the test method provided in FIG. 1.

Of course, besides the software implementation, the present disclosure does not exclude other implementations, such as logic devices or combination of software and hardware. That is, the execution subject of the following processing flow is not limited to the logic units, and may be hardware or logic devices.

The system, the apparatus, the module, or the unit described in embodiments may be specifically implemented by a computer chip or entity, or implemented by a product with a specific function. One typical implementation device is a computer. Specifically, the computer may be, for example, a personal computer, a laptop computer, a cellular phone, a camera phone, a smart phone, a personal digital assistant, a media player, a navigation device, an email device, a game console, a tablet computer, a wearable device, or a combination of any of these devices.

For the convenience of description, the above devices are described in various units according to functions. Of course, when implementing the present disclosure, the functions of the units may be implemented in the same or a plurality of software and/or hardware.

A person skilled in the art should understand that embodiments of the present disclosure may be provided as a method, a system, or a computer program product. Therefore, the present disclosure may use a form of hardware only embodiments, software only embodiments, or embodiments with a combination of software and hardware. In addition, the present disclosure may use a form of a computer program product that is implemented on one or more computer-usable storage media (including but not limited to a disk memory, a CD-ROM, and an optical memory) that include computer-usable program code.

The present disclosure is described with reference to the flowcharts and/or block diagrams of the method, the device (system), and the computer program product according to embodiments of the present disclosure. It should be understood that computer program instructions can be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of another programmable data processing device generate an apparatus for implementing a specific function in one or more processes in the flowcharts and/or in one or more blocks in the block diagrams.

These computer program instructions may be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), input/output interfaces, network interfaces, and memory.

The memory may include non-permanent storage in a computer-readable medium, random access memory (RAM) and/or non-volatile memory in the form of read-only memory (ROM) or flash RAM. Memory is an example of a computer-readable medium.

The computer-readable media, including both permanent and non-permanent, removable and non-removable media, may be implemented by any method or technology for storage of information. The information may be computer-readable instructions, data structures, modules of a program, or other data. Examples of the computer storage media include, but are not limited to, a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technology, a compact disk-read-only memory (CD-ROM), a digital versatile disk (DVD) or other optical storage, a magnetic cassette, a magnetic tape magnetic disk storage or other magnetic storage devices, or any other non-transmission medium that may be used to store information that may be accessed by a computing device. As defined herein, a computer-readable medium does not include a transitory computer-readable medium such as a modulated data signal and a carrier wave.

It should be noted that, a term "include" or any other variant thereof is intended to cover a non-exclusive inclusion, so that a process, a method, an article, or a device that includes a series of elements not only includes those elements but also includes other elements that are not expressly listed, or further includes elements inherent to such a process, method, article, or device. An element preceded by "includes a . . . " does not, without more constraints, preclude the existence of additional identical elements in the process, method, article, or device that includes the element.

Those skilled in the art should understand that embodiments of the present disclosure may be provided as a method, a system, or a computer program product. Therefore, the present disclosure may use a form of hardware only embodiments, software only embodiments, or embodiments with a combination of software and hardware. In addition, the present disclosure may use a form of a computer program product that is implemented on one or more computer-usable storage media (including but not limited to a disk memory, a CD-ROM, and an optical memory) that include computer-usable program code.

The present disclosure may be described in the general context of executable computer instructions executed by a computer, for example, a program module. Generally, the program unit includes a routine, program, object, component, data structure, and the like for executing a particular task or implementing a particular abstract data type. The present disclosure may also be practiced in distributed computing environments in which tasks are performed by remote processing devices that are connected through a communication network. In the distributed computing environment, program modules may be located in both local and remote computer storage media including storage devices.

Embodiments in the specification are all described in a progressive manner, same or similar parts between embodiments may be mutually referenced, and each embodiment focuses on a difference from other embodiments. Especially, a system embodiment is basically similar to a method embodiment, and therefore is described briefly; and for related parts, reference may be made to partial descriptions in the method embodiment.

The above description is merely an embodiment of the present disclosure and is not intended to limit the present disclosure. For those skilled in the art, various modifications and changes may be made to the present disclosure. Any modification, equivalent replacement, improvement, or the like made without departing from the spirit and principle of the present disclosure shall fall within the protection scope of the present disclosure.

What is claimed is:

1. A test method, comprising:
pre-acquiring handling device system parameters and simulation carrier model files, wherein each of the simulation carrier model files contains a simulation carrier model and carrier parameters, the simulation carrier models contained in different simulation carrier model files are different, and the carrier parameters contained in the different simulation carrier model files vary;
determining test cases according to the handling device system parameters and the simulation carrier model files;
generating simulation carrier point clouds corresponding to the determined test cases; and
in response to a simulation test request, calling a target test case in the determined test cases, and performing a simulation test on a to-be-tested perception algorithm according to a simulation carrier point cloud, of the simulation carrier point clouds, corresponding to the target test case to obtain a simulation test result of the to-be-tested perception algorithm, wherein
the performing of the simulation test on the to-be-tested perception algorithm according to the simulation carrier point cloud corresponding to the target test case to obtain the simulation test result of the to-be-tested perception algorithm comprises:
inputting the simulation carrier point cloud corresponding to the target test case into the to-be-tested perception algorithm;
identifying and obtaining a target relative pose of a simulation carrier model, of the simulation carrier models, relative to a simulation handling device model in the target test case from the simulation carrier point cloud corresponding to the target test case by the to-be-tested perception algorithm;
taking a reference relative pose of the simulation carrier model relative to the simulation handling device model in the target test case as a reference; and
determining the simulation test result of the to-be-tested perception algorithm according to a difference between the target relative pose and the reference relative pose.

2. The method according to claim 1,
wherein the handling device system parameters comprise at least one of handling device parameters, sensor parameters, simulation scenario parameters, and a plurality of pose transformation strategies, and
wherein a simulation sensor described by the sensor parameters is configured on the simulation handling device model described by the handling device parameters, and wherein each of the plurality of pose transformation strategies is configured to indicate to transform a pose of the simulation handling device model or a pose of the simulation carrier model.

3. The method according to claim 1, wherein the determining of the test cases according to the handling device system parameters and the simulation carrier model files comprises:
selecting at least one simulation carrier model file from the simulation carrier model files;
selecting at least one set of handling device system parameters from the handling device system parameters, wherein the set of selected handling device system parameters contains at least one set of handling device parameters and at least one set of sensor parameters;
generating a test task according to the selected at least one simulation carrier model file and the selected handling device system parameters; and
performing permutation and combination on the at least one simulation carrier model file contained in the test task to obtain the test cases corresponding to the test task.

4. The method according to claim 1, wherein the determining of the test cases according to the handling device system parameters and the simulation carrier model files comprises:
in response to a selection operation of a user, determining at least one selected simulation carrier model file from the simulation carrier model files;
determining at least one set of selected handling device system parameters from the handling device system parameters, wherein the set of selected handling device system parameters contains at least one set of handling device parameters and at least one set of sensor parameters; and
generating the test cases according to the selected simulation carrier model files and the selected handling device system parameter.

5. The method according to claim 3, wherein the at least one set of selected handling device system parameters further contains at least one set of simulation scenario parameters and/or at least one set of pose transformation strategies.

6. The method according to claim 1, wherein
the handling device system parameters in the target test case comprises a handling device parameter and a sensor parameter, and
the generating of the simulation carrier point clouds corresponding to the determined test cases comprises:
for each of the determined test cases, determining an initial pose of the simulation carrier model according to the simulation carrier model and the carrier parameters contained in the selected at least one simulation carrier model file in the target test case;
determining an initial pose of the simulation handling device model according to the handling device parameters in the target test case;
determining the reference relative pose of the simulation carrier model relative to the simulation handling device model according to the initial pose of the simulation handling device model and the initial pose of the simulation carrier model; and generating the simulation carrier point cloud corresponding to the target test case according to the sensor parameter in the target test case and the reference relative pose.

7. The method according to claim 6, wherein the handling device system parameter in the target test case contains comprises a pose transformation strategy, and the determining of the reference relative pose of the simulation carrier model relative to the simulation handling device model according to the initial pose of the simulation handling device model and the initial pose of the simulation carrier model comprises:

when the pose transformation strategy in the target test case is a first pose transformation strategy, transforming the initial pose of the simulation handling device model, and determining the reference relative pose of the simulation handling device model relative to the simulation handling device model according to a transformed pose of the simulation handling device model and the initial pose of the simulation carrier model; and when the pose transformation strategy in the target test case is a second pose transformation strategy, transforming the initial pose of the simulation carrier model, and determining the reference relative pose of the simulation carrier model relative to the simulation handling device model according to the initial pose of the simulation handling device model and a transformed pose of the simulation carrier model.

8. The method according to claim 6, wherein the handling device system parameter in the target test case further contains a simulation scenario parameter, and the generating of the simulation carrier point cloud corresponding to the target test case according to the sensor parameter in the target test case and the reference relative pose comprises:

generating the simulation carrier point cloud corresponding to the target test case according to the sensor parameter and the simulation scenario parameter in the target test case as well as the reference relative pose.

9. The method according to claim 1, wherein the target test case corresponds to a plurality of sets of the simulation carrier point clouds, and wherein the reference relative pose of the simulation carrier models corresponding to the plurality of sets of the simulation carrier point clouds relative to the simulation handling device model vary.

10. The method according to claim 1, wherein the performing of the simulation test on the to-be-tested perception algorithm according to the simulation carrier point cloud corresponding to the target test case to obtain the simulation test result of the to-be-tested perception algorithm comprises:

for each set of a plurality of sets of the simulation carrier point clouds corresponding to the target test case, inputting the set of the plurality of sets of the simulation carrier point clouds into the to-be-tested perception algorithm, and identifying and obtaining the target relative pose of the simulation carrier model corresponding to the set of the plurality of sets of the simulation carrier point clouds relative to the simulation handling device model from the set of the plurality of sets of the simulation carrier point clouds by the to-be-tested perception algorithm;

taking the reference relative pose of the simulation carrier model corresponding to the set of simulation carrier point clouds relative to the simulation handling device model as the reference, and determining the simulation test result of the to-be-tested perception algorithm for detecting the set of the plurality of sets of the simulation carrier point clouds according to the difference between the reference relative pose corresponding to the set of the plurality of sets of the simulation carrier point clouds and the target relative pose corresponding to the set of the plurality of sets of the simulation carrier point clouds; and detecting the simulation test result of each set of the plurality of sets of the simulation carrier point clouds corresponding to the target test case according to the to-be-tested perception algorithm, and determining the simulation test result of the to-be-tested perception algorithm.

11. The method according to claim 1, wherein each set of the plurality of sets of the simulation carrier point clouds corresponds to a plurality of test distances, wherein a test distance of the plurality of test distances is defined as a distance between a carrier fork entry surface of the simulation carrier model and a center of a vehicle body of the simulation handling device model.

12. The method according to claim 1, wherein the to-be-tested perception algorithm comprises a plurality of perception algorithms, and each perception algorithm of the plurality of perception algorithms detects different features of a carrier when identifying a carrier pose.

13. The method according to claim 1, wherein the performing of the simulation test on the to-be-tested perception algorithm according to the simulation carrier point cloud corresponding to the target test case to obtain the simulation test result of the to-be-tested perception algorithm comprises:

for each to-be-tested perception algorithm, inputting the simulation carrier point cloud corresponding to the target test case into the to-be-tested perception algorithm, and identifying and obtaining the relative pose of the simulation carrier model in the target test case relative to the simulation handling device model from the simulation carrier point cloud corresponding to the target test case through detecting a feature of a carrier by the to-be-tested perception algorithm, wherein the relative pose is used as the target relative pose output by the to-be-tested perception algorithm; and taking the reference relative pose of the simulation carrier model relative to the simulation handling device model in the target test case as the reference, and determining the simulation test result of the to-be-tested perception algorithm according to the difference between the target relative pose output by the to-be-tested perception algorithm and the reference relative pose.

14. The method according to claim 1, further comprising:

pre-acquiring a real carrier point cloud corresponding to the target test case;

in response to a real test request, testing the to-be-tested perception algorithm according to the real carrier point cloud corresponding to the target test case to obtain a real test result of the to-be-tested perception algorithm; and determining a comprehensive test result of the to-be-tested perception algorithm according to the simulation test result and the real test result.

15. The method according to claim 1, wherein the pre-acquiring of the simulation carrier model files comprises:

pre-receiving the simulation carrier models input by a user and sizes corresponding to the simulation carrier models;

determining the carrier parameters according to the sizes corresponding to the simulation carrier models; and selecting the simulation carrier model files according to the simulation carrier models and the carrier parameters.

16. The method according to claim 1, further comprising:

statistically analyzing simulation test results of the to-be-tested perception algorithm, and determining a precision of the to-be-tested perception algorithm for detecting a pose of the simulation carrier model corresponding to the target test case; and generating a test report corresponding to the to-be-tested perception algorithm according to the determined precision of the to-be-tested perception algorithm for detecting the pose of the simulation carrier model corresponding to the target test case.

17. The method according to claim 1, wherein the performing of the simulation test on the to-be-tested perception algorithm according to the simulation carrier point cloud corresponding to the target test case to obtain the simulation test result of the to-be-tested perception algorithm comprises:

acquiring a preset query period and a preset test timeout duration;

when the query period is reached, querying whether there is the simulation test result of the to-be-tested perception algorithm obtained by executing the target test case, if yes, updating a test state of the target test case to be completed, and displaying the updated test state of the target test case to a user, if no, continuing to wait; and when the preset test timeout duration is reached, and a query finds that there is no simulation test result of the to-be-tested perception algorithm obtained by executing the target test case, updating the test state of the target test case to be abnormal, and displaying the abnormal test state of the target test case to the user.

18. A non-transitory computer-readable storage medium, storing a computer program which, when executed by a processor, causes the processor to perform operations, comprising:

pre-acquiring handling device system parameters and simulation carrier model files, wherein each of the simulation carrier model files contains a simulation carrier model and carrier parameters, the simulation carrier models contained in different simulation carrier model files are different, and the carrier parameters contained in the different simulation carrier model files vary;

determining test cases according to the handling device system parameters and the simulation carrier model files;

generating simulation carrier point clouds corresponding to the determined test cases; and in response to a simulation test request, calling a target test case in the determined test cases, and performing a simulation test on a to-be-tested perception algorithm according to a simulation carrier point cloud, of the simulation carrier point clouds, corresponding to the target test case to obtain a simulation test result of the to-be-tested perception algorithm, wherein the performing of the simulation test on the to-be-tested perception algorithm according to the simulation carrier point cloud corresponding to the target test case to obtain the simulation test result of the to-be-tested perception algorithm comprises:

inputting the simulation carrier point cloud corresponding to the target test case into a to-be-tested perception algorithm;

identifying and obtaining a target relative pose of a simulation carrier model relative to a simulation handling device model in the target test case from the simulation carrier point cloud corresponding to the target test case by the to-be-tested perception algorithm;

taking a reference relative pose of the simulation carrier model relative to the simulation handling device model in the target test case as a reference; and determining the simulation test result of the to-be-tested perception algorithm according to a difference between the target relative pose and the reference relative pose.

19. The method of claim 2, wherein the simulation handling device model described by the handling device parameters includes at least one from a group of an automated guided vehicle (AGV), an autonomous mobile robot (AMR), a humanoid robot, a forklift, a reach truck, a stacker, and a tow tractor.

* * * * *